(12) United States Patent
Bradley

(10) Patent No.: US 9,153,224 B2
(45) Date of Patent: *Oct. 6, 2015

(54) ENHANCED SONAR MOUNT SYSTEMS, STRUCTURES AND PROCESSES

(76) Inventor: Reason Bradley, Mill Valley, CA (US)

( * ) Notice: Subject to any disclaimer, the term of this patent is extended or adjusted under 35 U.S.C. 154(b) by 786 days.

This patent is subject to a terminal disclaimer.

(21) Appl. No.: 13/346,506

(22) Filed: Jan. 9, 2012

(65) Prior Publication Data

US 2012/0176867 A1    Jul. 12, 2012

Related U.S. Application Data

(63) Continuation-in-part of application No. 12/884,745, filed on Sep. 17, 2010, now Pat. No. 8,094,520.

(60) Provisional application No. 61/243,750, filed on Sep. 18, 2009.

(51) Int. Cl.
  *G10K 11/00* (2006.01)
  *G01S 15/88* (2006.01)

(52) U.S. Cl.
  CPC .............. *G10K 11/006* (2013.01); *G01S 15/88* (2013.01); *G10K 11/004* (2013.01)

(58) Field of Classification Search
  CPC .. G10K 1/006; G10K 11/004; G10K 11/0041
  USPC ........................................................ 367/173
  See application file for complete search history.

(56) References Cited

U.S. PATENT DOCUMENTS

| | | | |
|---|---|---|---|
| 3,752,431 A * | 8/1973 | McBride | 248/291.1 |
| 3,989,216 A * | 11/1976 | Veatch | 248/278.1 |
| 4,815,048 A | 3/1989 | Boucher et al. | |
| 4,982,924 A | 1/1991 | Havins | |
| 5,182,732 A | 1/1993 | Pichowkin | |
| 7,548,490 B2 * | 6/2009 | Snyder | 367/173 |
| 8,094,520 B2 * | 1/2012 | Bradley | 367/173 |
| 2002/0067662 A1 | 6/2002 | Carney | |

* cited by examiner

*Primary Examiner* — Ian J Lobo
(74) *Attorney, Agent, or Firm* — Craig M. Stainbrook; Stainbrook & Stainbrook, LLP

(57) ABSTRACT

Enhanced sonar mount structures, systems, and associated processes provide accurate, precise, and repeatable alignment of a sonar head in relation to a vessel, whether in or out of water. The enhanced mount typically comprises a tilt mechanism, wherein the sonar head can be lifted to a stowable position, e.g. for any of vessel maneuvering, mooring, or trailering. The mount typically comprises a cross tube coupled to a clamp mechanism and to a Z tube. The clamp mechanism is operable to establish and maintain any of Z direction or pitch. The enhanced mount provides repeatable positioning of both the cross tube and the Z tube, and may preferably provide any of ship to ship interchangeability, lateral and vertical adjustability, break away clamping of the cross tube, quick release mechanisms, hingeable stowage, or manual or remote pan or tilt. An optional modular mounting kit aids in situ installations.

26 Claims, 25 Drawing Sheets

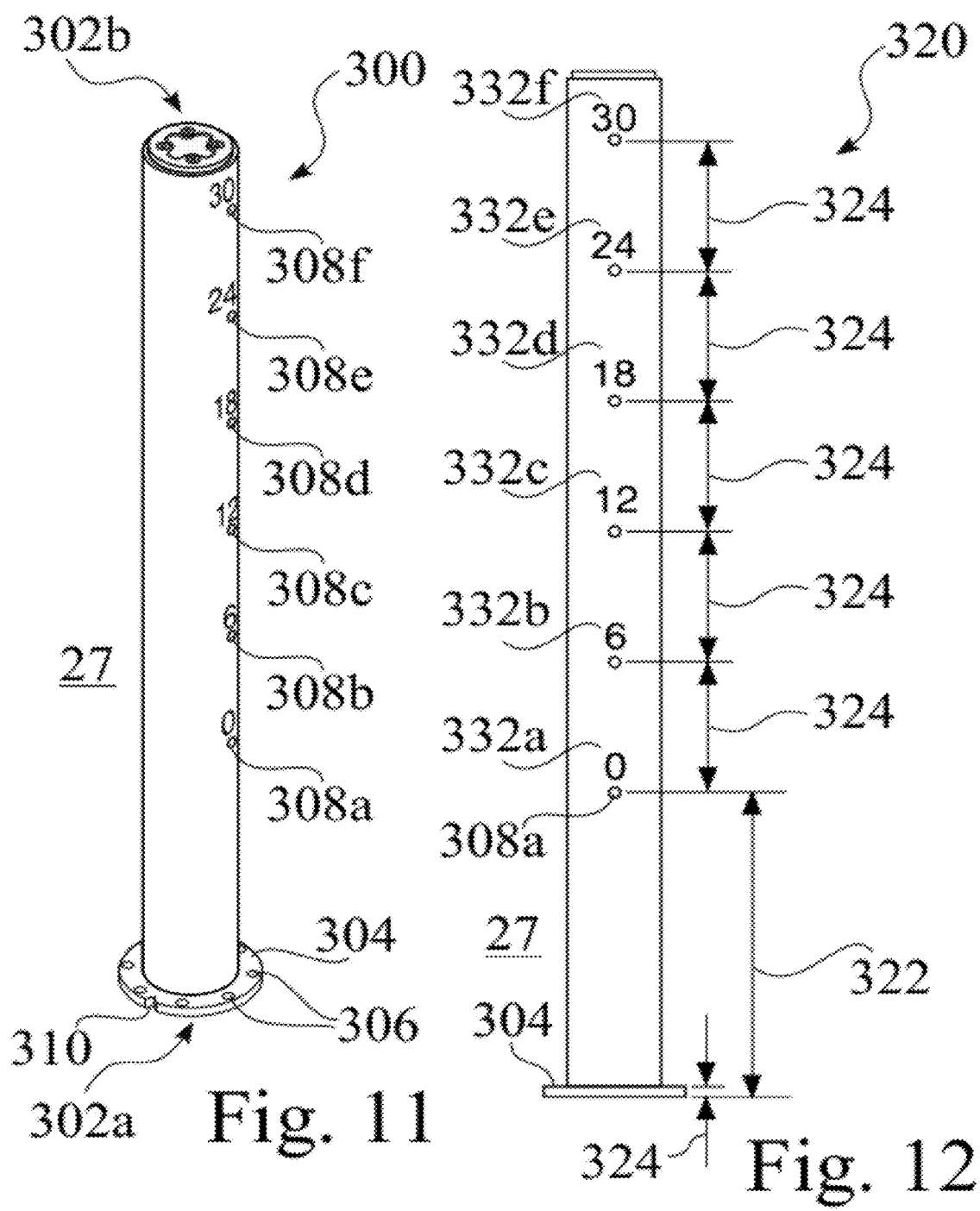

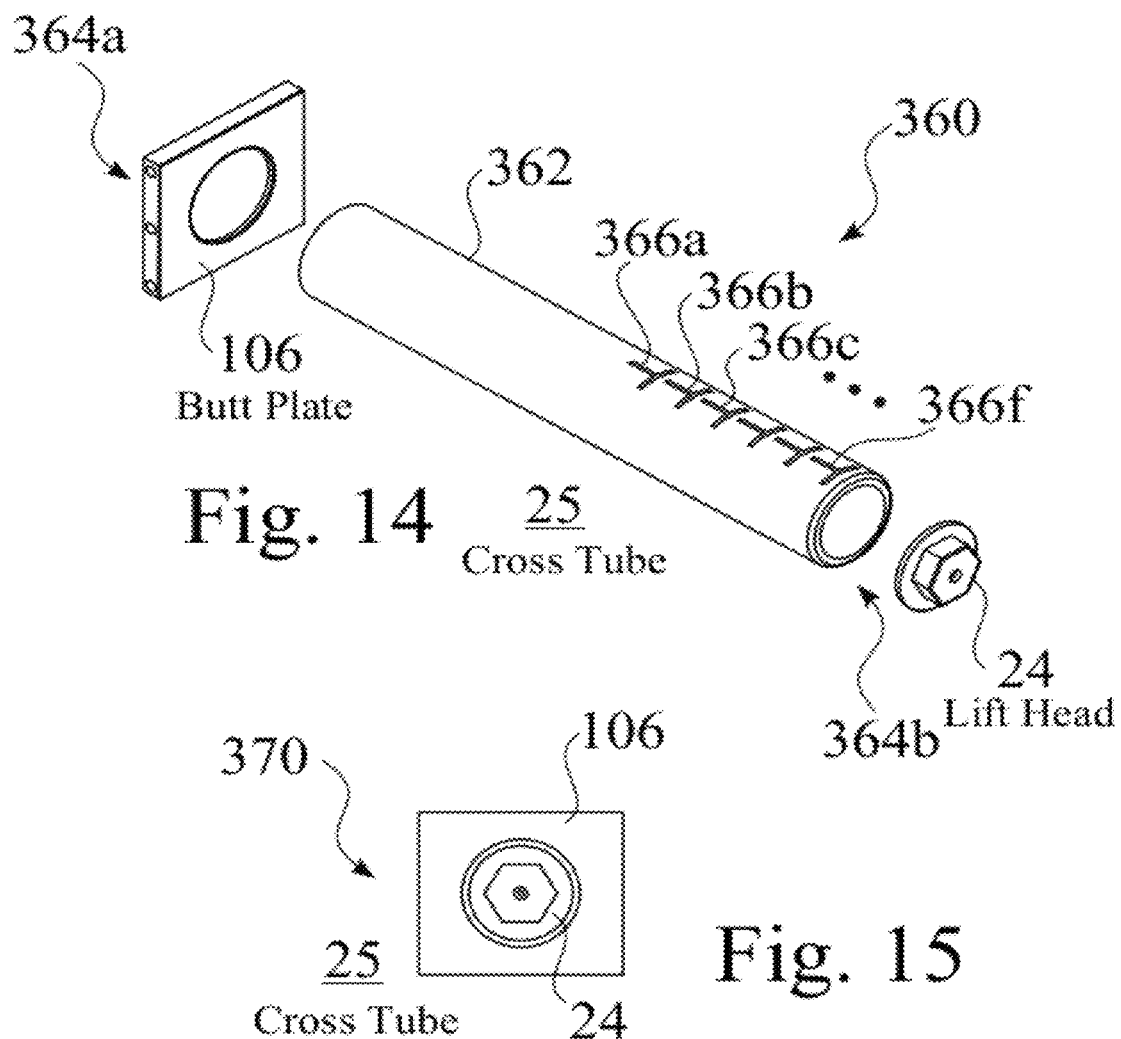
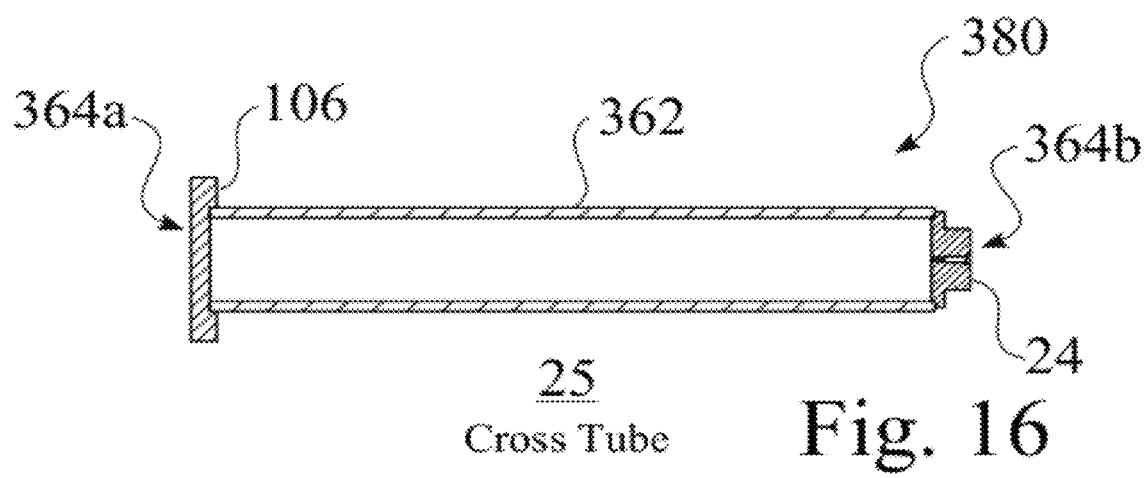

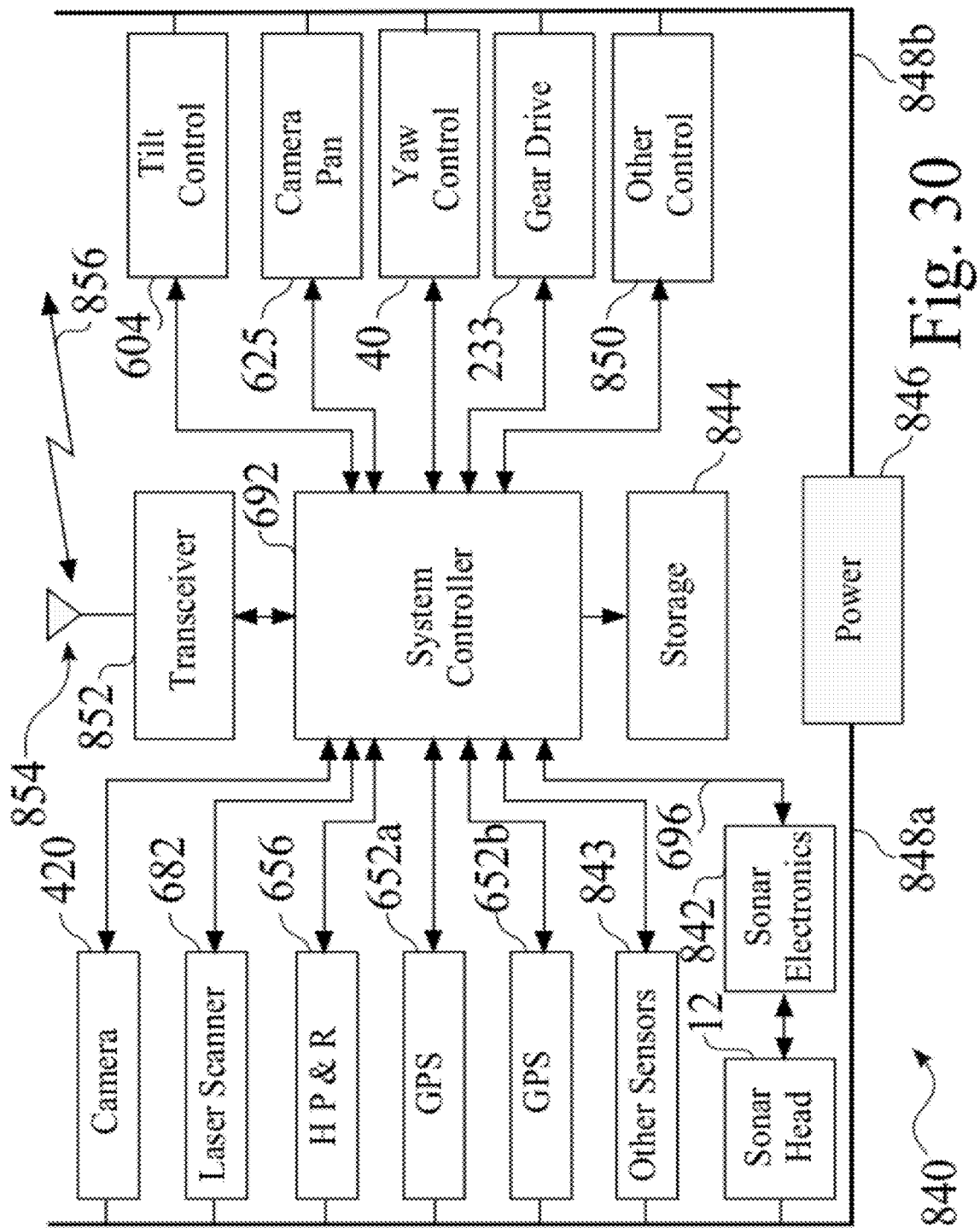

ENHANCED SONAR MOUNT SYSTEMS, STRUCTURES AND PROCESSES

CROSS REFERENCE TO RELATED APPLICATIONS

This Application is a Continuation in Part and claims priority for commonly disclosed subject matter to U.S. application Ser. No. 12/884,745, entitled Sonar Mount, filed 17 Sep. 2010 now U.S. Pat. No. 8,094,520, which claims priority to U.S. Provisional Patent Application Ser. No. 61/243,750, filed 18 Sep. 2009, each of which is incorporated herein in its entirety by this reference thereto.

BACKGROUND OF THE INVENTION

1. Technical Field

The invention relates to electronic equipment that is used in connection with boats and ships. More particularly, the invention relates to a sonar mount for use with a boat or ship.

2. Description of the Background Art

Performing sonar surveys is an important marine industry. The usefulness of sonar surveys is directly affected by the accuracy and precision with which the sonar head is mounted to the boat or ship. As well, sonar surveys are important for Homeland security, in addition to and federal and state mandates for management of coastal zone resources.

Sonar equipment typically consists of an electronics unit, which is placed in the boat for the operator to use, and a sonar head unit, which is placed in the water beneath the boat. Accurate and precise placement of the sonar head is critical to correct operation of the sonar equipment. It is not possible in most cases to install a sonar head to a boat at the time the boat or ship is manufactured. Rather, such equipment is retrofitted to the boat. If a boat has sonar equipment, then a provision must also be made for removing or otherwise relocating the sonar head from the boat when the boat is placed on a trailer. This is because the sonar head typically projects well below the bottom of the boat's hull and, as such, would prevent the boat from being trailered without first removing or relocating the sonar head. This introduces many problems with regard to recalibrating the sonar head to the boat when it is replaced. Further, the sonar head is typically part of a heavy mounting assembly and, as such, positioning and replacing the sonar head is not a trivial task.

It would be advantageous to provide an enhanced sonar mount structure, system and associated process that improves the accuracy and precision with which a sonar head is mounted to the boat or ship. Such a development would provide a significant technological advance.

Furthermore, it would be advantageous to provide such a sonar mount structure, system and associated process that is readily integrated with associated marine electronics, and provides ease of setup, usability and efficiency to get a survey task performed, so the user can focus on real-time decision making. Such a sonar system would constitute a further technological advance.

SUMMARY OF THE INVENTION

Enhanced sonar mount structures, systems, and associated processes provide accurate, precise, and repeatable alignment of a sonar head in relation to a vessel, whether in or out of water. The enhanced mount typically comprises a tilt mechanism, wherein the sonar head can be lifted to a stowable position, e.g. for any of vessel maneuvering, mooring, or trailering. The mount typically comprises a cross tube coupled to a clamp mechanism and to a Z tube. The clamp mechanism is operable to establish and maintain any of Z direction or pitch. The enhanced mount provides repeatable positioning of both the cross tube and the Z tube, and may preferably provide any of ship to ship interchangeability, lateral and vertical adjustability, break away clamping of the cross tube, quick release mechanisms, hingeable stowage, or manual or remote pan or tilt. An optional modular mounting kit aids in situ installations.

BRIEF DESCRIPTION OF THE DRAWINGS

FIG. 11 is a perspective view of an exemplary enhanced Z-pole assembly for an enhanced sonar mount;

FIG. 12 is a side view of an exemplary enhanced Z-pole assembly for an enhanced sonar mount;

FIG. 13 is an end view of an exemplary enhanced Z-pole assembly for an enhanced sonar mount;

FIG. 14 is an expanded assembly view of an exemplary cross pole assembly for an enhanced sonar mount;

FIG. 15 is an end view of an exemplary cross pole assembly for an enhanced sonar mount;

FIG. 16 is a cross-sectional side view of an exemplary cross pole assembly for an enhanced sonar mount;

FIG. 30 is a schematic block diagram of an exemplary system comprising and enhanced sonar mount.

DETAILED DESCRIPTION OF THE INVENTION

Figure 1:
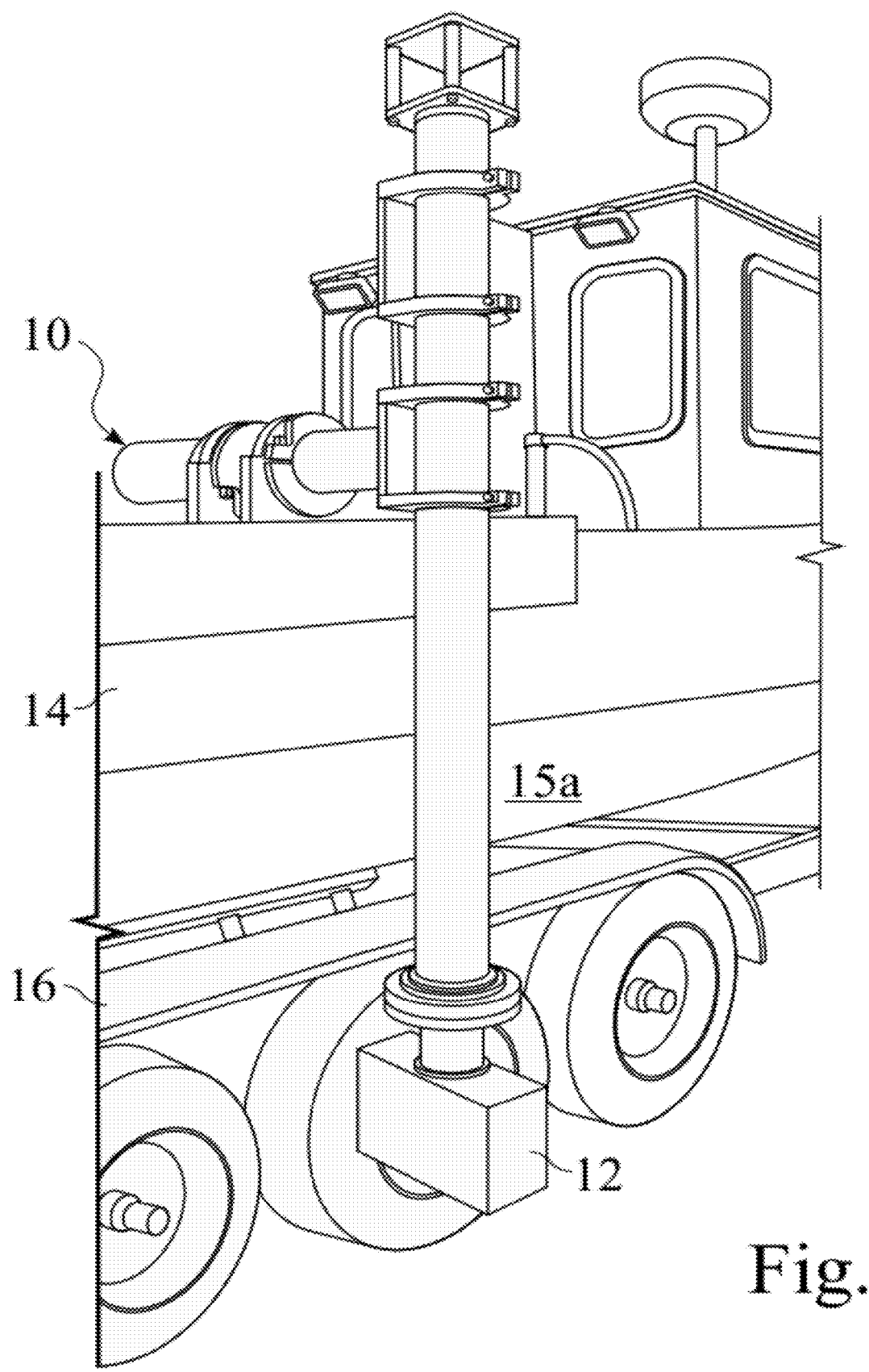
FIG. 1 is a perspective view of an exemplary embodiment of an enhanced sonar mount affixed to a boat, wherein the boat is located on a trailer.

FIG. 1 is a perspective view of a sonar mount affixed to a boat 14, wherein the boat 14 is located resting upon a trailer 16. A sonar head unit 12 is attached to an end of a sonar mount 10, wherein the sonar mount 10 is attached to the deck of the boat. The exemplary embodiment of the sonar mount 10 shown in FIG. 1 is readily adjusted for a precise and accurate alignment relative to the boat, and is tiltable about an axis of rotation to allow the sonar head 12 to be elevated 15s (FIG. 29) when the boat is on a trailer, for example, and to be readily lowered into an operable position 15a when the boat is in the water. The sonar mount 10 may also be tilted to a vertical position and serve as an antenna mast (discussed below).

Figure 2:
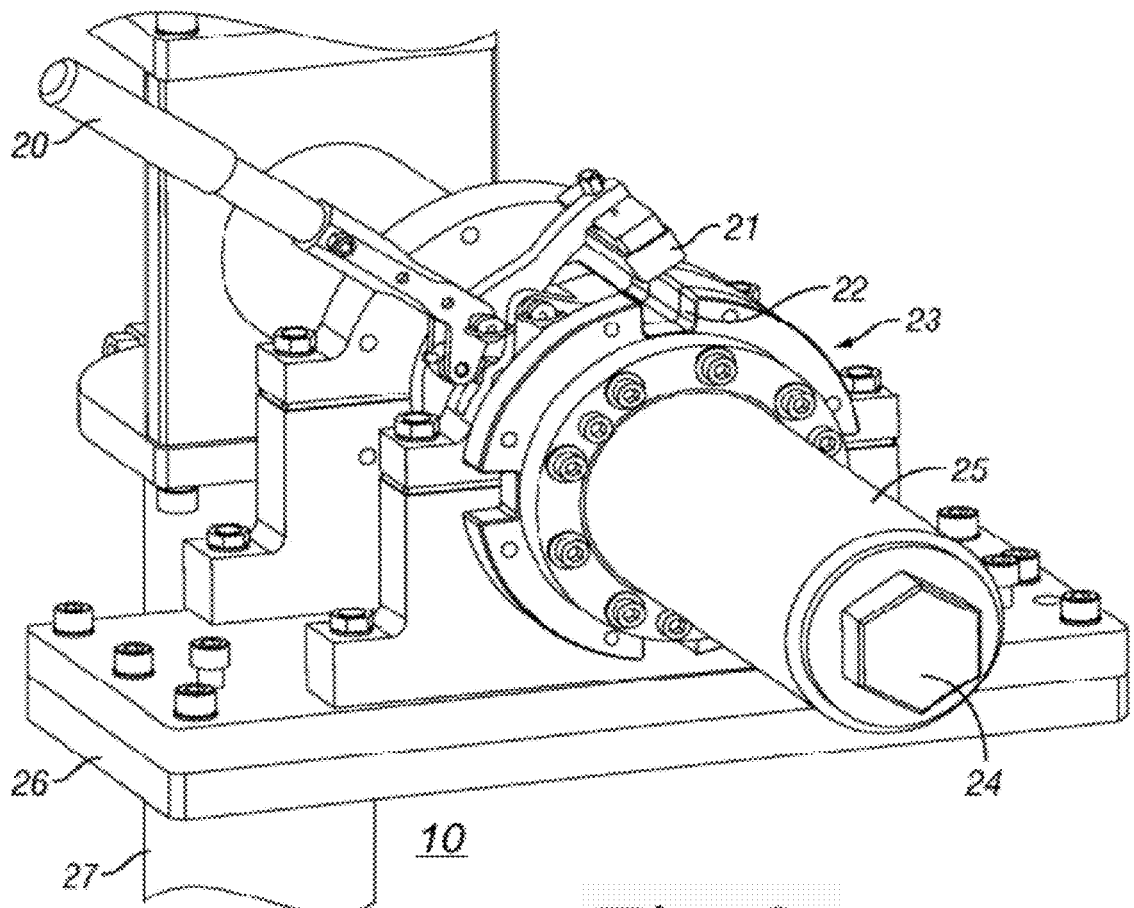
FIG. 2 is a perspective view of an exemplary embodiment of an enhanced sonar mount showing a clamp assembly.

FIG. 2 is a partial perspective view of a sonar mount 10. In FIG. 2, the sonar mount 10 is shown having a base plate 26 with clamp bolts. An embodiment of the invention provides a compound base plate (discussed below). The base plate is secured to the deck of a boat by bolts, screws, or other such fastening and/or securing mechanisms.

The sonar mount 10 includes a clamping assembly that comprises a tube collar assembly 23, which is clamped is a cross tube 25 (the cross tube clamp is discussed in greater detail below). The cross tube 25 rotates about an axis 208 (FIG. 9) to effect tilting of the sonar head 12. The cross tube 25 is locked into a desired orientation by operation of a clamp lever 20 which, in turn, selectively engages and disengages a pawl 21 with one of two or more notches 22 formed in a periphery of the tube collar assembly. The cross tube is coupled to a Z tube 27. The Z tube is arranged perpendicular to the cross tube in this embodiment and supports the sonar head 12, as discussed in greater detail below.

The sonar mount 10 may be operated to raise and lower the sonar head 12 with a wrench (not shown). A lift head 24 is provided to receive a wrench or other tool, which wrench or tool is then used to rotate that cross tube which, in turn, raises or lowers the Z tube 27, and thus raises or lowers the sonar head 12.

Figure 3:
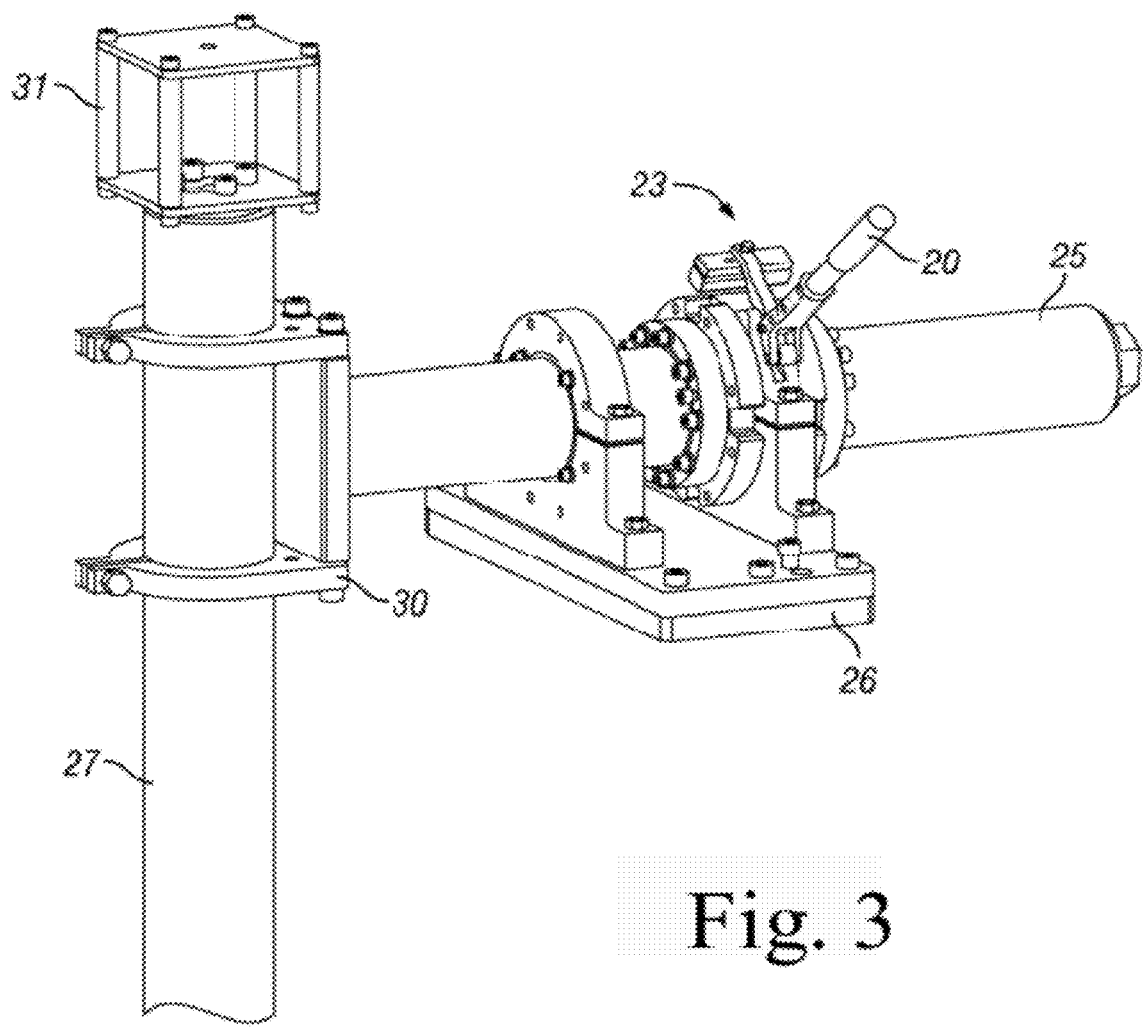
FIG. 3 is a perspective view of an exemplary embodiment of an enhanced sonar mount showing a cross tube and a Z tube, in which the Z tube is in a vertical orientation.

FIG. 3 is a perspective view of a sonar mount showing a cross tube 25 and a Z tube 27, in which the Z tube 27 is in a vertical orientation. In FIG. 3, the cross tube 25 is shown coupled to the Z tube 27 by a Z clamp assembly 30. An antenna head 31 is also provided. Thus, the sonar mount 10 may serve a dual function of supporting a sonar head 10 when the Z tube 27 is oriented vertically downward and an antenna when the Z tube 27 is oriented vertically upward.

Figure 4:
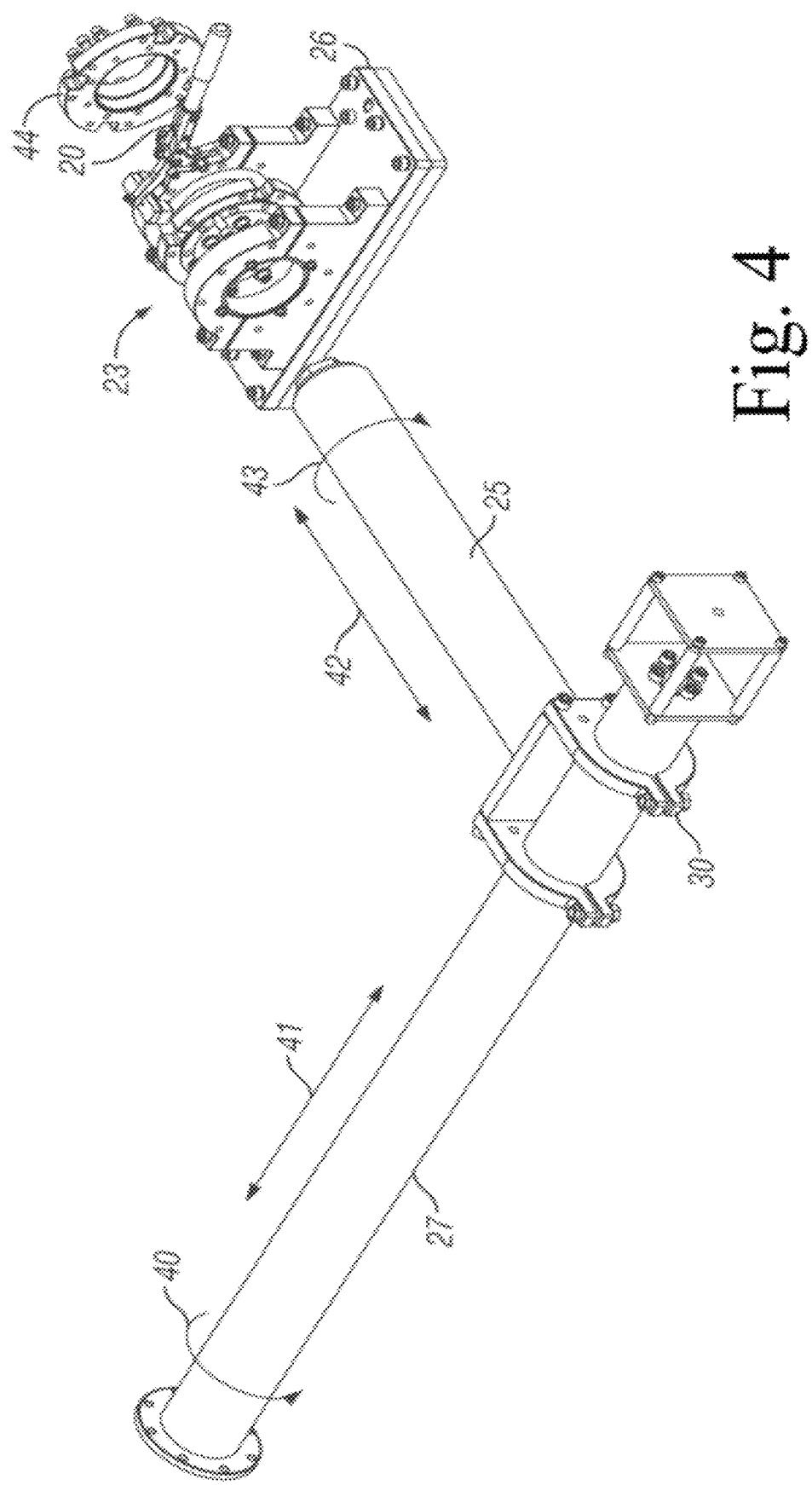
FIG. 4 is an exploded perspective view of an exemplary embodiment of an enhanced sonar mount showing a clamp assembly, a cross tube, and a Z tube, in which the Z tube is in a horizontal orientation.
Figure 19:
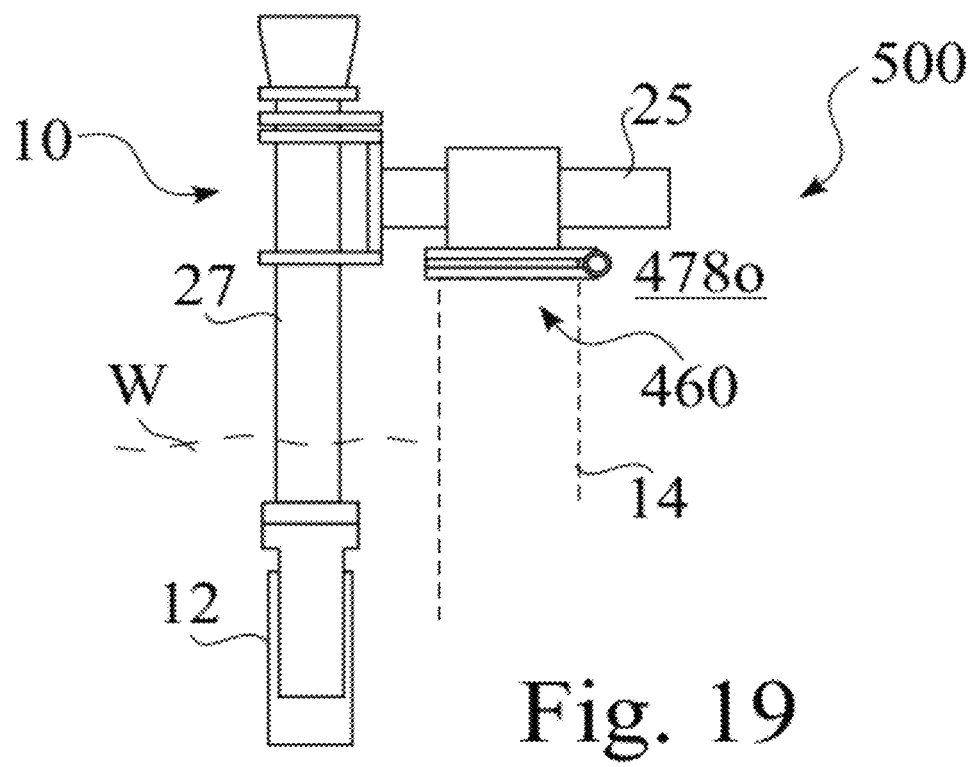
FIG. 19 is a schematic view of a sonar mount attached to an installed hinge mount assembly, wherein the hinge mount assembly is in an operable position.

FIG. 4 is an exploded perspective view of a sonar mount showing a Z clamp assembly 30, a cross tube 25, and a Z tube 27, in which the Z tube 27 is in a horizontal orientation. In FIG. 4, it can be seen that the cross tube 25 is adjustable in both a Z (in/out) direction 42 and the pitch of the cross tube is adjustable 43. These adjustments are made possible by a clamping mechanism comprising a tube collar assembly 44 (discussed below). When the clamping mechanism is released, the cross tube 25 is movable to adjust the cross tube's pitch and Z position. The Z position adjustment allows the Z tube 27 (and the sonar head 12) to be positioned relative to the side of the boat 14 when the sonar head 12 is lowered into the water W (FIG. 19). Thus, this adjustment allows precise setting of the spacing of the sonar head 12 from the side of the boat 14. The pitch adjustment 43 allows the cross pole 25 to be positioned perpendicular to the surface of the water W with a notch 22 in the tube collar 23 positioned at tube dead center. It is typical for a boat 14 to have a sloping deck. If this adjustment where not provided, then the base plate would establish the pitch of the cross tube 25. If this pitch were not parallel to the surface of the water W, then the Z tube 27 would not be perpendicular to the surface of the water W when the sonar head 12 is lowered into its operating position. The pitch adjustment 43 allows the sonar mount 10 to compensate for the slope of the deck. In this way, the sonar mount 10 can lock the cross tube 25 into position by engaging the pawl 21 associated with the clamp lever into the notch 22, and assure that the Z tube 27 is perpendicular to the surface of the water W. This presents a proper orientation of the sonar head 12.

The Z tube 27 is secured to the cross tube 25 by the Z clamp assembly 30. The Z clamp assembly 30 allows adjustment of the Z tube 27 in the Z (in/out) direction 41 to affect a proper height or depth for the sonar head 12, and it also allows a yaw adjustment 40, such as to position the sonar head 12 parallel to the boat 14.

Figure 5:
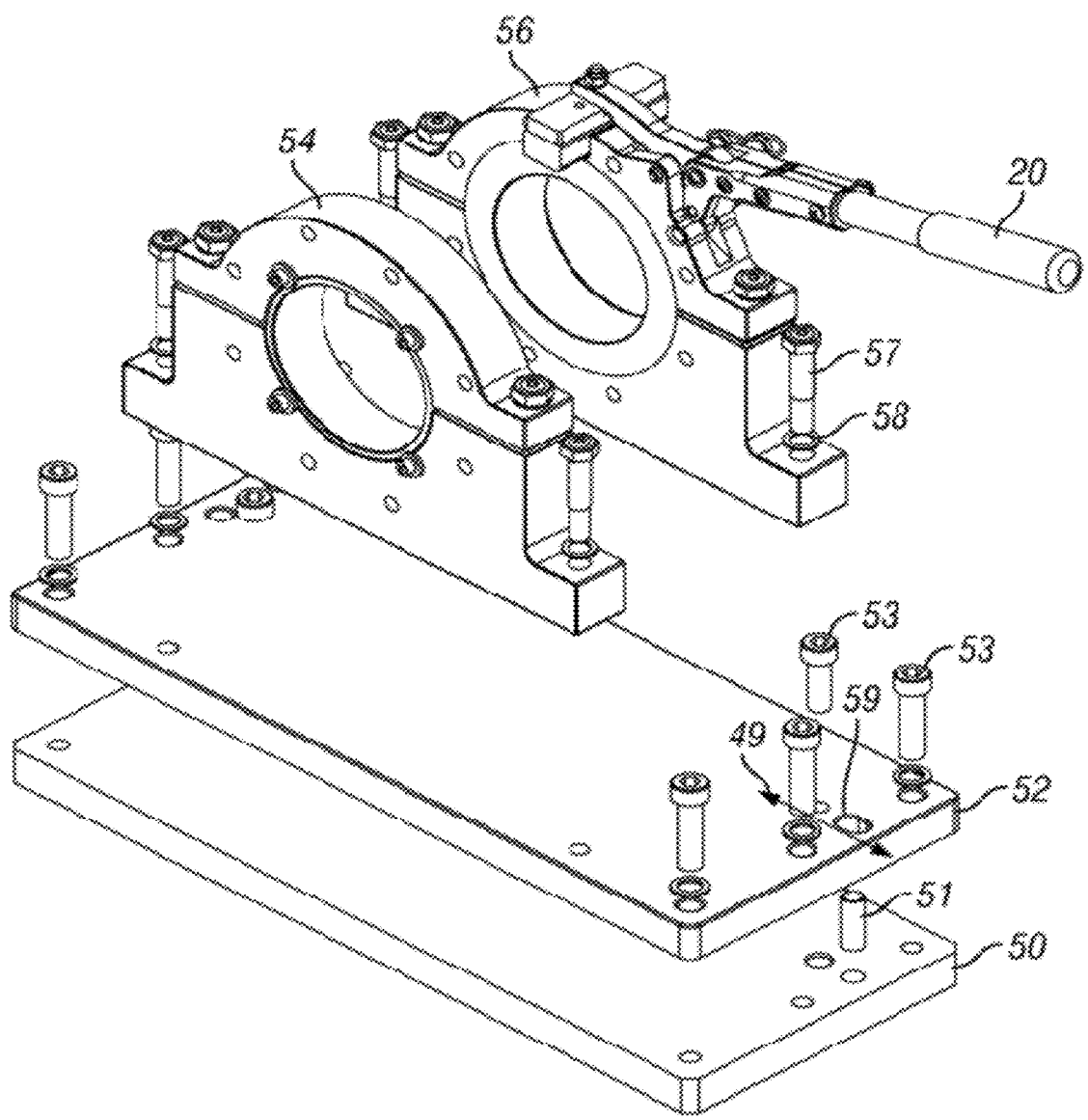
FIG. 5 is an exploded perspective view of an exemplary embodiment of an enhanced sonar mount showing a clamp assembly.

FIG. 5 is an exploded partial perspective view of an exemplary enhanced sonar mount 10 showing a clamp assembly. In FIG. 5, a basic clamp block 54 serves to support and guide the cross tube 25 and thus provides both rigidity to the sonar mount 10 and a bearing surface to allow smooth rotation of the cross tube 25 while raising and lowering the sonar head 12. The clamp lever is shown with a locking clamp block 56, described above in connection with the notch and pawl mechanism. The basic clamp block 54 and locking clamp block 56 are each secured to a base plate 52 by a plurality of bolts 57 and washers 58. Those skilled in the art will appreciate that other mechanisms can be used to secure the basic clamp block 54 and locking clamp block 56 to the base plate, or they may even be welded thereto.

The exemplary base plate 51 seen in FIG. 5 mates with a fixed plate 50. The fixed plate 50 is attached to the deck or rail R (FIG. 29) of the boat 14, for example with screws or bolts and the based plate is attached thereto with bolts or screws 53. This two-part arrangement is advantageous in that it allows the sonar mount 10 to be removed from the boat 14 by separating the base plate 52 from the fixed plate 50. Because the fixed plate 50 remains attached to the boat 14, the alignment of the sonar head 12 that was achieved is maintained. That is, when the base plate 51 is recoupled to the fixed plate 50, the sonar mount 10 is positioned on the boat 14 in the exact same orientation it had before it was removed from the boat 14. Because the base plate 52 and fixed plate 50 may be subject to thermal expansion, a key pin 51 is provided with the fixed plate 50 that engages with a linear slot 59 formed in the base plate 52. In this way, some linear motion is permitted along an axis 49 parallel to the boat 14. This allows ready engagement of the base plate 52 and fixed plate 50 while maintaining alignment.

Figure 6:
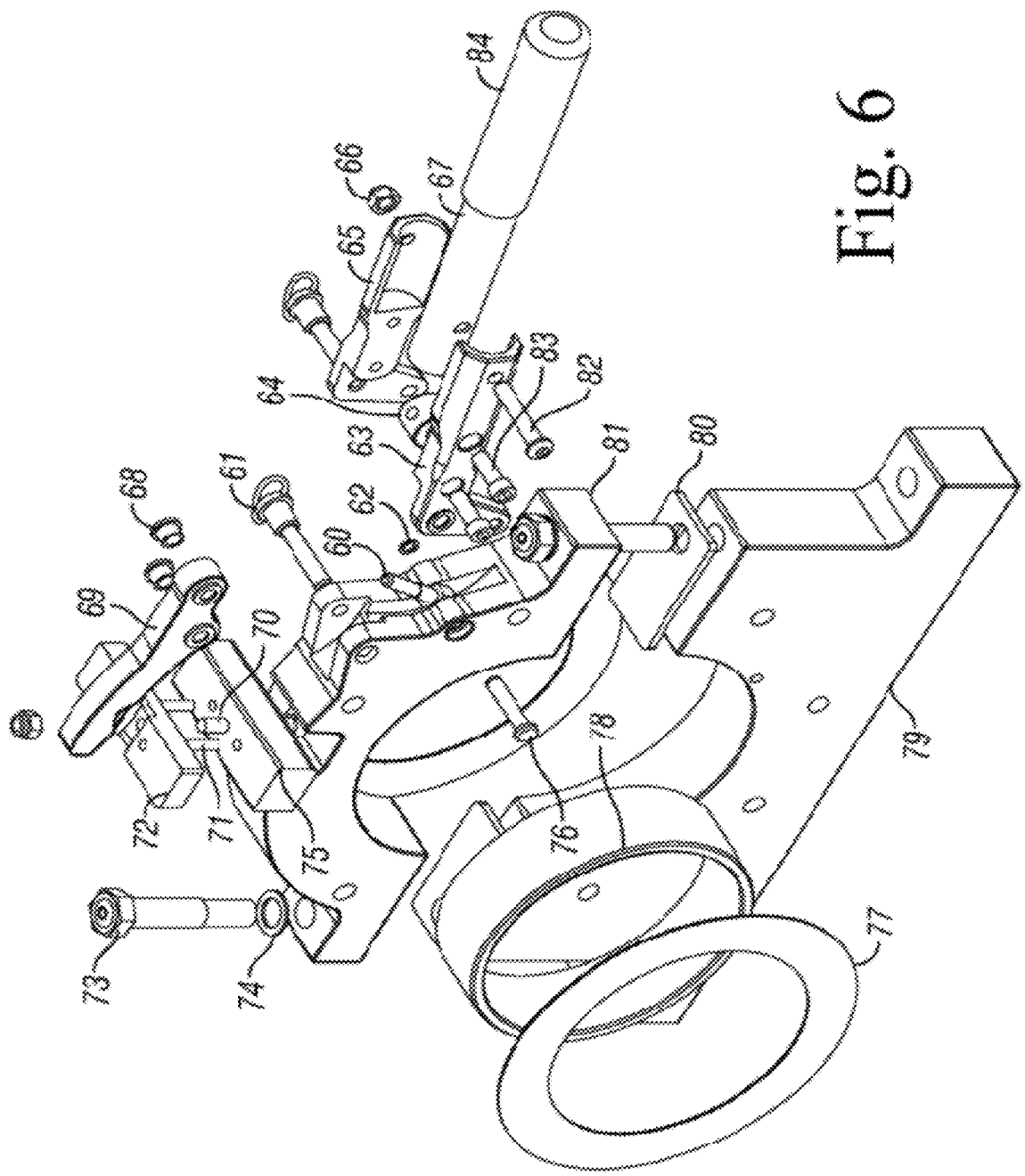
FIG. 6 is an exploded perspective view of an exemplary embodiment of an enhanced sonar mount showing a detail of a clamp assembly.

FIG. 6 is an exploded partial perspective view of an exemplary enhanced sonar mount 10, showing detail of a clamp assembly. In FIG. 6, the base clamp 79 and top clamp 81 are joined by bolts 73 and washers 74 and comprise two halves of the locking clamp block that supports a clamping mechanism that, in this embodiment, includes a thrust washer 77 for the main clamp and a bushing 78 for the cross tube 25. A shim 80 may be provided to assure proper spacing of the base clamp 79 and the top clamp 81.

The pawl 21 comprises a shear block 75, shear block backing plate 72, dowel pin 71 and screw 70. A clamp arm 69 couples the pawl to the clamp lever, and includes a flared bushing 68 that is secured to the top clamp by a quick pin 61. A second quick pin secures a clamp lever front portion 63 to the clamp arm 69. A clevis pin 76 and retaining ring 62 secure a shoulder rod 60 to the top clamp. The shoulder rod and clamp lever front portion engage with an end of the clamp arm and with a clamp adjuster barrel 64 to effect a detent operation that locks the mechanism during a portion of its range of motion. The clamp lever includes a clamp lever back portion 65 screw 82 and nut 66, and a further screw 83, that engage to hold the clamp lever front and back together and to clamp them to a clamp lever handle extension 67, which has a grip portion 84.

Figure 7:
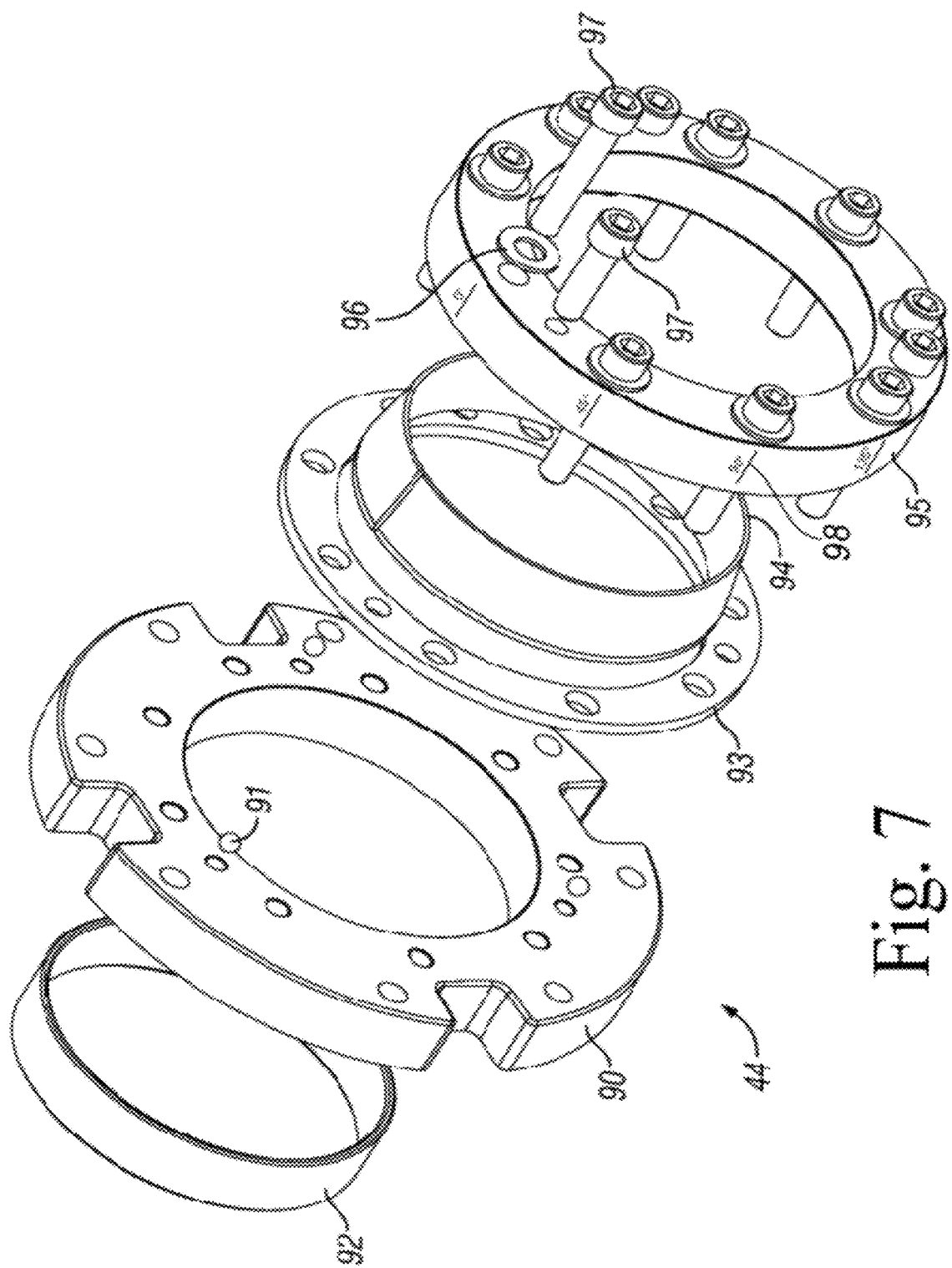
FIG. 7 is an exploded perspective view of an exemplary embodiment of an enhanced sonar mount showing a further detail of a clamp.

FIG. 7 is an exploded partial perspective view of an exemplary enhanced sonar mount 10, showing a further detail of a clamp assembly. In FIG. 7, the tube collar assembly 44 includes a bushing lock ring 92, inner clamp ring 93, and collet 94 that secure the cross tube 25 against rotation when clamped tightly together by an outer clamp ring 95. This clamping is effected by tightening bolts 97 having corresponding washers 96. Thus, the cross tube is adjusted as preferred when the bolts are loosened and secured in a selected alignment when the bolts are tightened. A bearing mechanism is provided that consists of steel ball bearings 91 and corresponding apertures formed in the clamp bolt ring 90. As also seen in FIG. 7, the outer clamp ring 95 may preferably further comprise one or more index marks 98, e.g. such as formed by laser etching, which may preferably be used for setting or confirming the pitch of the cross tube 25.

When the cross tube 25 is locked into a desired orientation by the engagement of the pawl 21 with one of the notches 22 formed in a periphery of the tube collar assembly, the shear block 75 also provides protection for the sonar head 12, which is typically expensive, since the shear block 75 is configured to break away or shear if the sonar head 12 or Z tube 27 comes into contact with an object, such as when the boat 14 travels through the water W.

Figure 8:
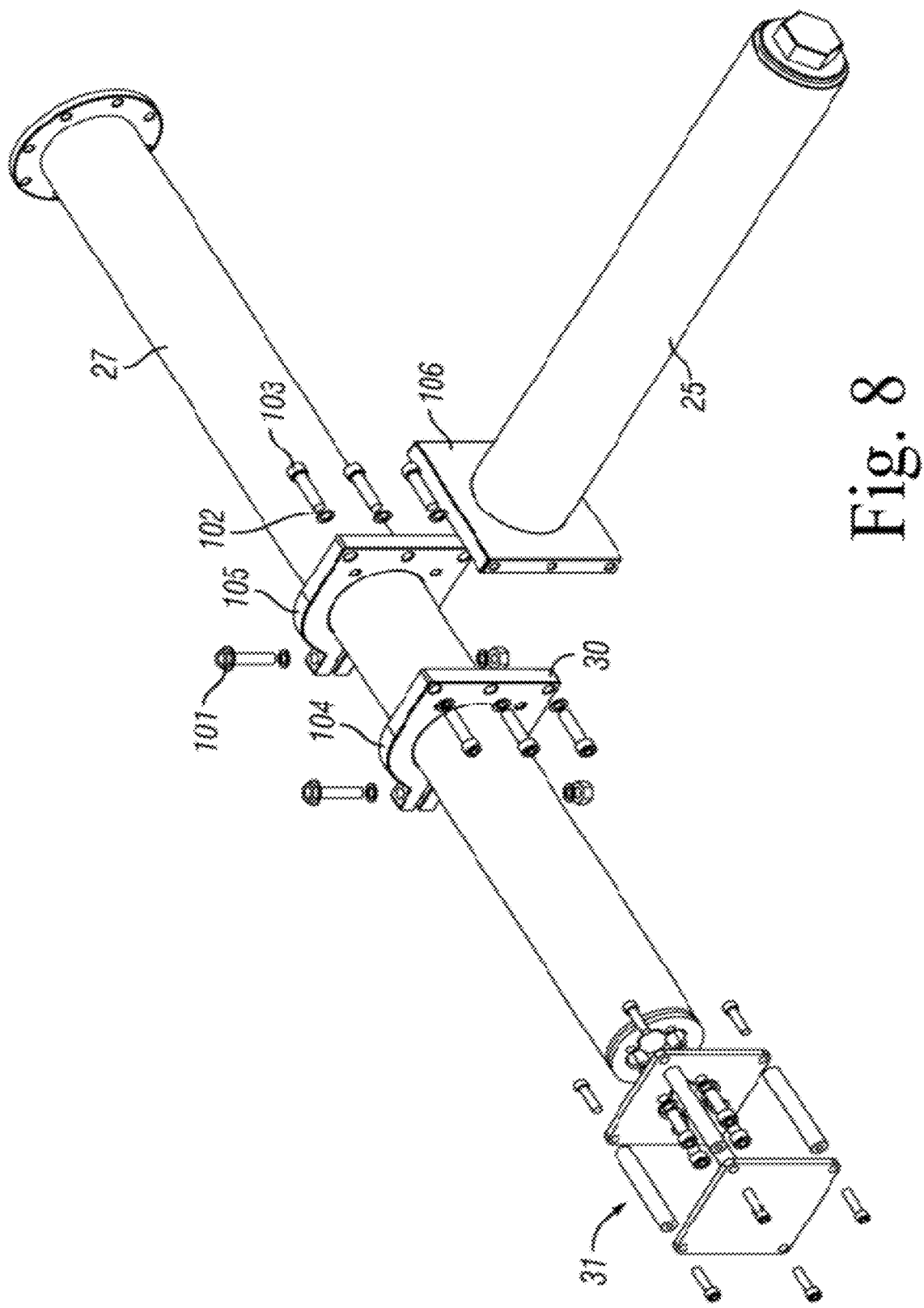
FIG. 8 is an exploded perspective view of an exemplary embodiment of an enhanced sonar mount showing a cross tube and a Z tube.

FIG. 8 is an exploded partial perspective view of an exemplary sonar mount 10 showing a cross tube 25 and a Z tube 27. In FIG. 8, the Z clamp 30 is shown to comprise a pair of C clamps 104, 105 which are secured to the Z tube 27 by bolts 101 and nuts 100, and a butt plate 106 at an end of the cross tube that is screwed to the C clamps by screws 103 having washers 102. In this arrangement, the Z tube 27 may be positioned with regard to height and yaw relative to the cross tube 25 by loosening the C clamp bolts 101, establishing the desired relationship between the Z tube 27 and the cross tube 25, and then tightening the bolts 101.

Gear Lift Drive.

Figure 9:
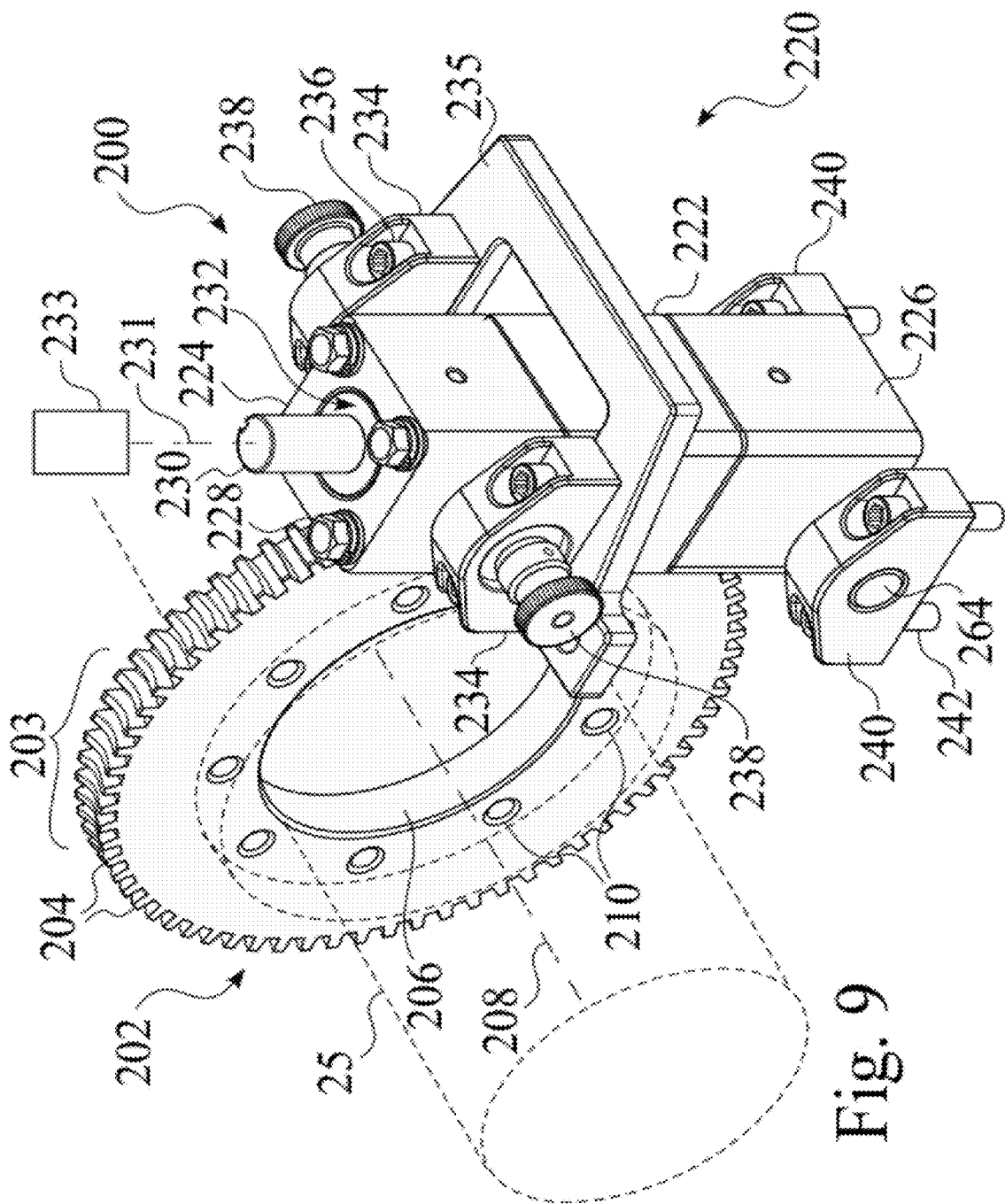
FIG. 9 is a perspective view of an exemplary gear lift drive assembly for an enhanced sonar mount.
Figure 10:
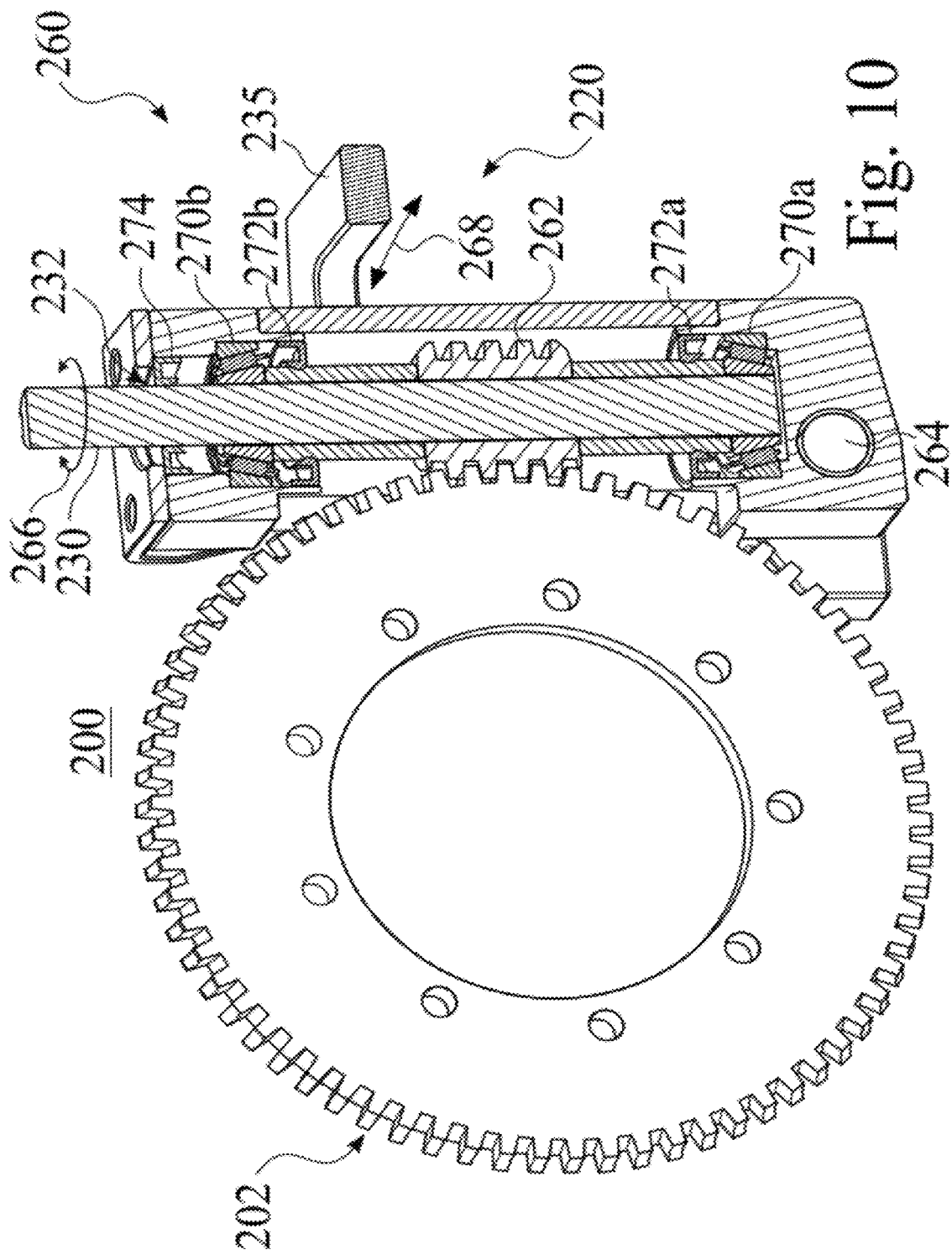
FIG. 10 is a partial cutaway view of an exemplary drive gear lift drive assembly for an enhanced sonar mount.

FIG. 9 is a perspective view of an exemplary gear lift drive assembly 200 for an enhanced sonar mount 10. FIG. 10 is a partial cutaway view 260 of an exemplary drive gear lift drive assembly 200 for an enhanced sonar mount 10. The gear lift assembly 200 comprises a mechanism for controllably rotating a cross tube 25 of an enhanced sonar mount 10, wherein the Z-tube assembly 27 may be rotated, e.g. between an upper stored position 15s (FIG. 29) and a lower active position 15a (FIG. 1).

In the exemplary gear lift drive assembly 200 seen in FIG. 9 and FIG. 10, a ring gear 202, comprising a plurality of teeth 204 defined about an outer periphery 203, has a mounting hole 206 defined therethrough about an axis 208, and a plurality of mounting holes 210, wherein the ring gear 202 is mountable to the cross tube 25 of an enhanced sonar mount 10, such as through a flange, e.g. outer clamp ring 95, associated with the cross tube 25.

The exemplary gear lift drive assembly 200 seen in FIG. 9 and FIG. 10 further comprises a gear lift drive mechanism 220, which may be mountably affixable, such as in relation to a hull of a boat or ship 14, and/or in relation to the base plate 26 of the enhanced sonar mount 10. The exemplary gear lift drive mechanism 220 seen in FIG. 9 and FIG. 10 comprises a central case member 222, an upper case member 224, and a lower case member 226, which are assembled using fastener assemblies 228. As seen in FIG. 10, a drive shaft 230 extends into a cavity 232 that is defined through the case members. The exemplary gear lift drive mechanism 220 further comprises support bearings 270a, 270b, inner seals 272a,272b, and an outer shaft seal 274.

The exemplary ring gear drive mechanism 220 seen in FIG. 10 comprises a drive gear 262, e.g. a worm gear 262, mounted to the drive shaft 230, which meshes with neighboring teeth 204 on the ring gear 202, such that rotation of the drive shaft 230 and the drive gear 262, about axis 231, results in rotation of the ring gear 202 about the ring gear axis 208. The drive shaft 230 may be rotated 233 manually, or may otherwise be driven by other rotation means 233, e.g. an electric, pneumatic or hydraulic actuator, such as through any of local, remote, or automated control.

The gear lift drive mechanism 220 seen in FIG. 9 and FIG. 10 comprises pivot blocks 240 that are fixably mountable, e.g. by fasteners 242, with respect to the base plate 26 of the enhanced sonar mount 10. The pivot blocks 240 support a pivot 264 that extends through the lower case member 226. A pin plate 235 is also fixably mountable with respect to the enhanced sonar mount 10. Pin blocks 234 are mounted to the pin plate 235, through which release pins 238 retain the upper case member 224 in a first set position, and allow rotation 268 (FIG. 10) of the gear lift drive mechanism 220 away from the ring gear 202 in a second released position.

Pole Location Markings and System Integration.

FIG. 11 is a perspective view 300 of an exemplary Z-pole assembly 27 for an enhanced sonar mount 10. FIG. 12 is a side view 320 of an exemplary Z-pole assembly 27 for an enhanced sonar mount 10. FIG. 13 is an end view 340 of an exemplary Z-pole assembly 27 for an enhanced sonar mount 10.

The exemplary enhanced Z-pole assembly 27 comprises a plurality of mounting holes 308, e.g. 308a-308f, and associated indicia 332, e.g. 332a-332f, by which the Z-pole 27 may be controllably mounted within the enhanced sonar mount 10, such as to vary the vertical mounting location of a sonar head assembly 12 with respect to the enhanced sonar mount 10, e.g. with respect to the Z clamp assembly 30.

The distance 324 between the holes 308 may preferably be evenly spaced, and may further be integrated, e.g. through a system controller 692 (FIG. 27), such that a chosen hole 332, e.g. 332b, is a known distance, e.g. 6 inches, from a neighboring hole 332, e.g. 332a.

A sonar head mounting flange 304, typically having a thickness 324, is located at a first lower end 302a of the Z-tube 27. The first mounting hole 308a is located at a distance 322 from the lower end 302a. As seen in FIG. 11 and FIG. 13, sonar head flange mounting holes 306 are defined through the mounting flange 304.

The mounting flange 304 may further comprise an alignment detail 310, such as but not limited to an indicia, a groove, a hole, or other marking, by which the circumferential orientation of the Z-tube 27 is readily determined. For example, the exemplary groove seen in FIG. 11 and FIG. 13 is located 90 degrees clockwise from the mounting holes 308, wherein the circumferential position of the Z-tube 27 may readily be determined before and/or after installation. A chosen groove and/or indicia 310 may also readily be linked to or otherwise integrated with the system controller 692 (FIG. 27), through which the specific location of a sonar head 12 may be determined and/or controlled.

FIG. 14 is an expanded assembly view 360 of an exemplary cross pole assembly 25 for an enhanced sonar mount 10. FIG. 15 is an end view 370 of an exemplary cross pole assembly 25 for an enhanced sonar mount 10. FIG. 16 is a cross-sectional side view 380 of an exemplary cross pole assembly 25 for an enhanced sonar mount 10.

The exemplary cross pole assembly 25 seen in FIG. 14 comprises a cross tube member 362 that extends from a butt plate 106 at a first end 364a to a lift head 24 at a second end 364b. One or more grooves and/or indicia 366, e.g. 366a-366f are located axially along the cross tube member 362, such as spaced at evenly spaced or otherwise known locations, wherein the cross pole 25 may readily be mounted in one or more locations with respect to the enhanced sonar mount 10, such as to provide different offsets from which to extend the Z-pole 27 with respect to the hull of a boat or ship. A chosen groove and/or indicia 366 may also readily be linked to the system controller 692 (FIG. 27), through which the specific location of a sonar head 12 may be determined.

Quick Release Mechanisms.

Figure 17:
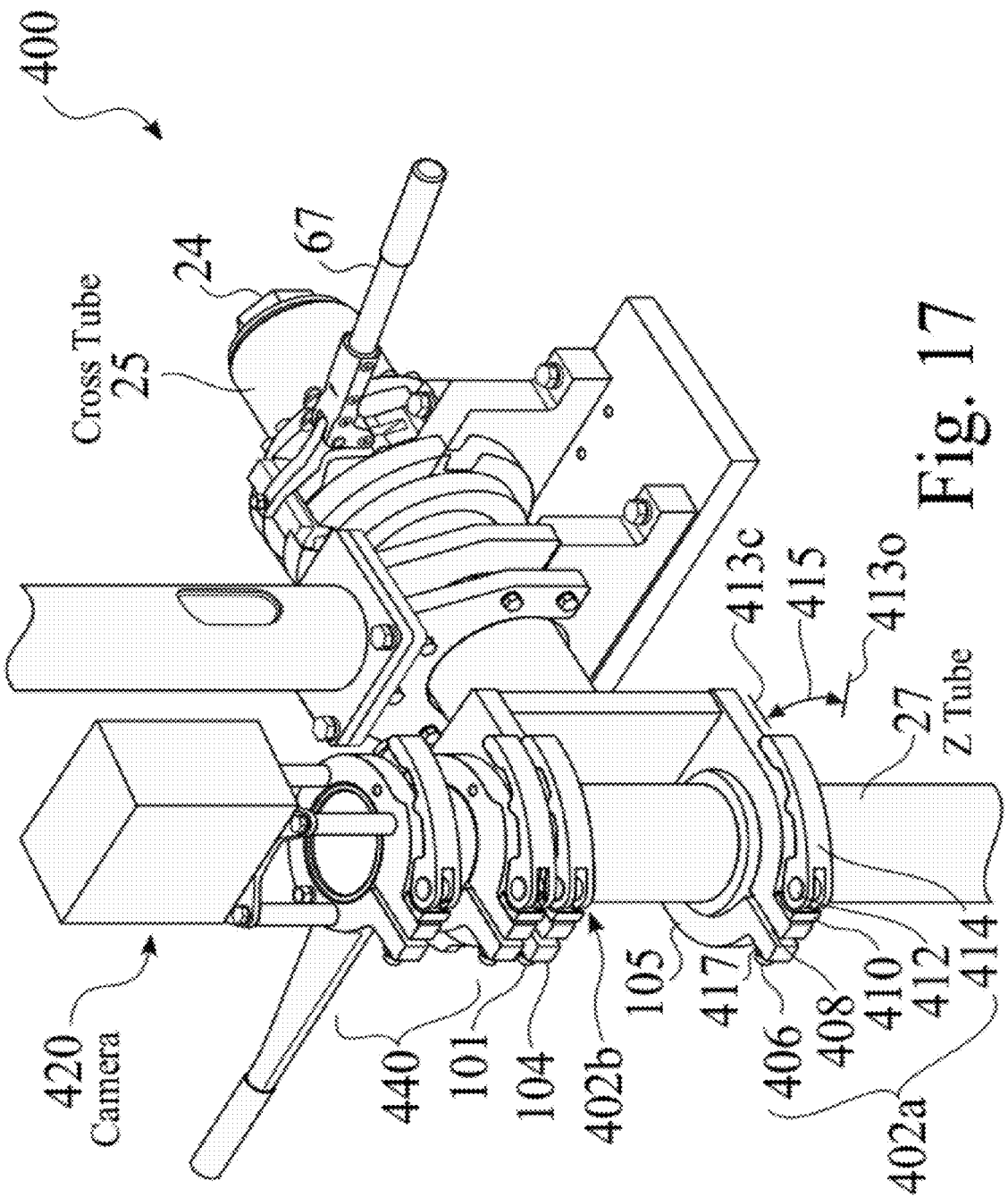
FIG. 17 is a partial perspective assembly view of an enhanced sonar mount having quick-release mounts for any of a Z-pole or a camera mount.

FIG. 17 is a partial perspective assembly view 400 of an enhanced sonar mount 10 having one or more quick-release mounts 402 for any of a Z-pole 27 or a mount 440, such as for a camera 420.

For example, the exemplary C clamps 104, 105 seen in FIG. 17 are secured to the Z tube 27 by exemplary quick release mechanisms 402, e.g. 402a,402b, which comprise a threaded member 408, an affixed head or nut 406, and a quick release lever 414, such as rotatably affixed to the threaded shaft 408 by a pivot member 412. The quick release lever 414 is typically movable 415 between an open, i.e. released position 413o, wherein the C clamps 104,105 are not affixed to the Z-member 27, and a closed, i.e. affixed position 413c, wherein the C clamps 104,105 are affixed to the Z-member 27. The defined shape of the quick release lever 414 may preferably be chosen to provide a different force between the open position 413o and the closed position 413c, such as directly between the quick release lever 414 and the C clamps 104, 105, or to an intermediate cam follower 410, while allowing the user USR to operate the lever 414, to tighten or loosen the C clamps 104,105 in relation to the Z-tube 27. The quick release mechanisms 402 may further comprise a spring element 417 on one or both sides of the threaded member 408.

The quick-release mounts 402 readily provide any of assembly, disassembly, and/or adjustment, without the need for tools, e.g. wrenches, ratchets, and/or sockets. This is particularly advantageous for the enhanced sonar mount 10, which is typically installed on boats or ships 14, where tools may readily be misplaced or lost.

The quick-release mounts 402 may preferably be color coded for purpose, such that one or more elements for each assembly 402 may be readily identified by color for any of installation, adjustment, operation, or disassembly. For example, the quick release levers 414 that correspond to C clamps 104,105, associated with retaining the Z tube 27, may be anodized a first color, e.g. blue, while a quick release lever 414 that corresponds to a different clamp, e.g. 631 (FIG. 24), associated with a camera 420, may be anodized a second color, e.g. green.

Hinge Option with Lock.

Figure 18:
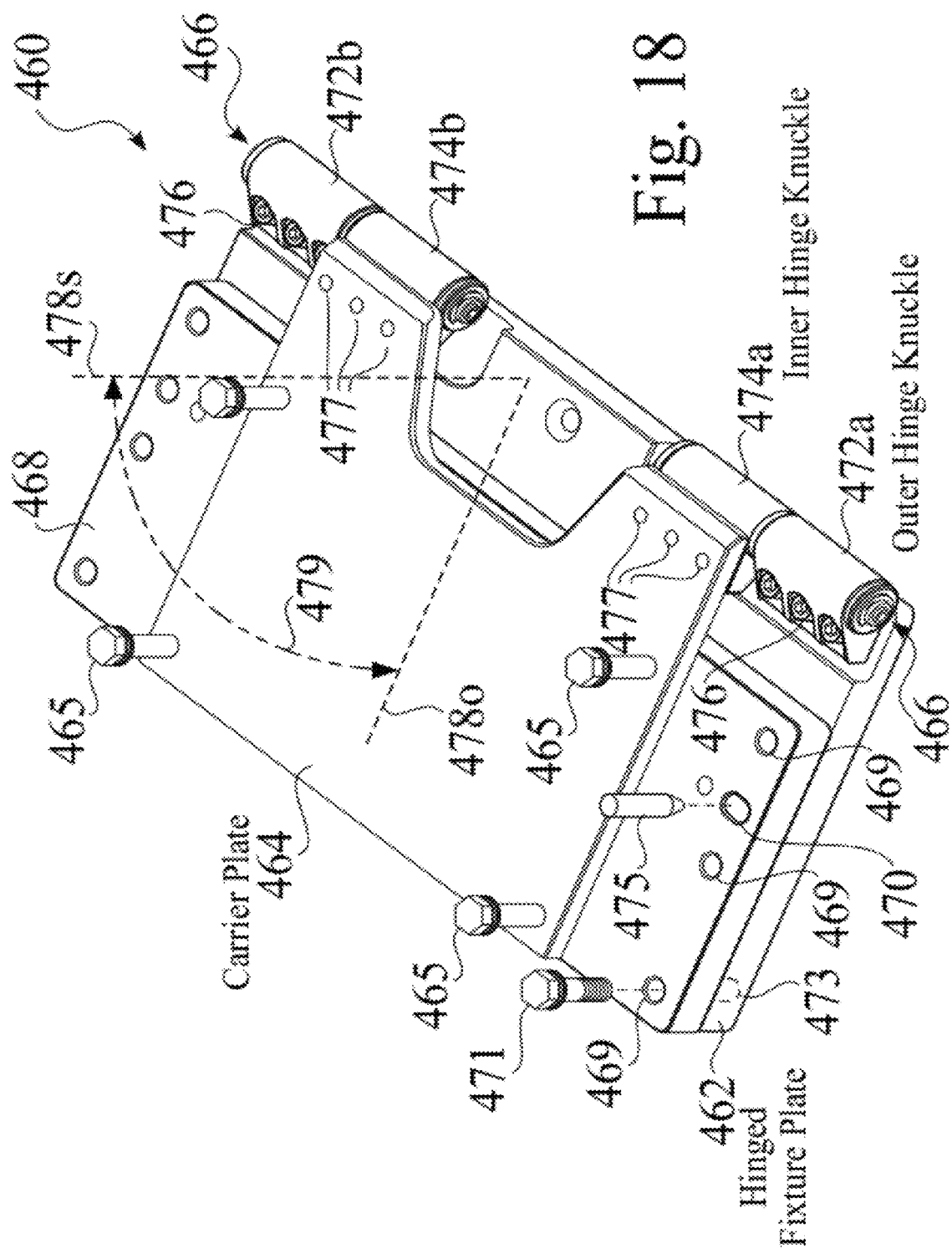
FIG. 18 is a perspective view of a hinge mount assembly for an enhanced sonar mount.
Figure 20:
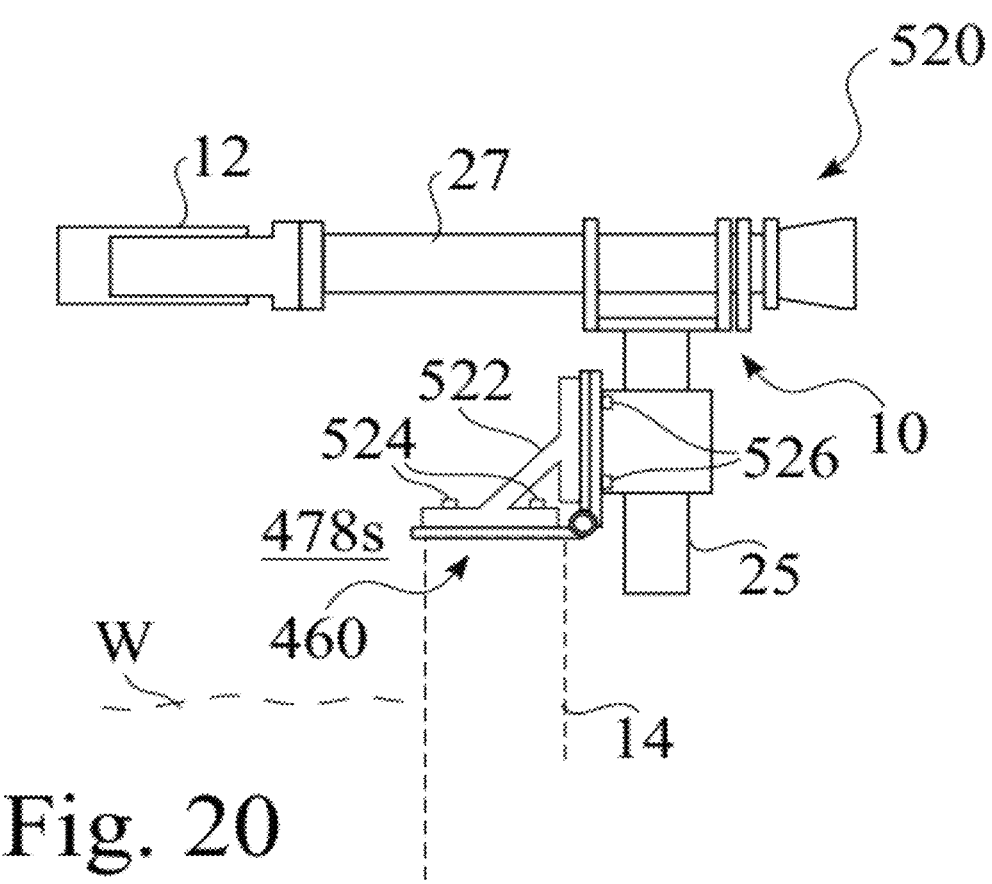
FIG. 20 is a schematic view of a sonar mount attached to an installed hinge mount assembly, wherein the hinge mount assembly is in a stowed position.

FIG. 18 is a perspective view of an exemplary hinge mount assembly 460 for an enhanced sonar mount 10. The hinge mount assembly 460 may preferably be used to hingeably mount a sonar mount 10 or other mechanisms, such as in relation to a vessel 14, e.g. to provide accurate positioning and attachment of the enhanced sonar mount 10 to the deck or rail R of a boat or ship 14, while also providing an accurate mechanism by which the sonar mount 10 may be rotated in place. FIG. 19 is a schematic view 500 of a sonar mount 10 attached to an installed hinge mount assembly 460, wherein the hinge mount assembly 460 is in an operable position 478o. FIG. 20 is a schematic view 520 of a sonar mount 10 attached to an installed hinge mount assembly 460, wherein the hinge mount assembly 460 is in a stowed position 478s.

An exemplary hinge mount assembly 460, available through Universal Solar Mount, Inc., of Sausalito, Calif., allows an enhanced sonar mount 10 to be rotated by up to 90 degrees, such as to be stowed out of the water W and inboard while not in use, while simultaneously keeping the position of the sonar mount 10 calibrated. When the sonar mount 10 is returned from a stowed position 478s to an operable position 478o, the enhanced sonar mount 10 may retain a previously calibrated position, thus allowing the sonar mount 10 to be rapidly returned to service, without the need for recalibration.

The exemplary hinge mount assembly 460 seen in FIG. 18 comprises a lower hinged fixture plate 462 that is hinged in relation to an upper carrier plate 464. A base plate 468, e.g. such as a base plate 26 for an enhanced sonar mount 10, is located between the hinged fixture plate 462 and the upper carrier plate 464, such that the enhanced sonar mount 10 may be fixably attached; e.g. by fasteners 465, to the upper carrier plate 464, to form a fixed coplanar relationship between the base plate 468 and the carrier plate 464.

The base plate 468 is fixably attachable to the fixture plate 462 when the carrier plate is in the operable position 478o, such as by fasteners 471 that extend through holes 469 in the base plate 468 and into threaded holes 473 in the fixture plate 462. Before tightening of fasteners 471, one or more alignment pins 475 may preferably be inserted through alignment holes 470, which may comprise oval, i.e. slotted, holes, to holes located in the fixture plate 462, such as to aid accurate alignment of the sonar mount 10 in relation to the hinge mount assembly 460.

As also seen in FIG. 18, outer hinge knuckles 472a, 472b are attached to the hinged fixture plate 462, such as by fasteners 476. Similarly, inner hinge knuckles 474a, 474b are attached to the carrier plate 464, such as by fasteners 477. The outer hinge knuckles 472a,472b are hingeably affixed to respective inner hinge knuckles 474a,474b, such as by hinge pin assemblies 466. The hardware associated with the exemplary hinge mount assembly 460 may preferably be comprised of corrosion resistant materials, such as but not limited to any of brass, stainless steel, titanium, Inconel®, Monel®, or any alloys thereof. In some embodiments of the hinge mount assembly 460, the plates 462, 464, 468 may preferably comprise any of aluminum, steel, stainless steel, or any alloy thereof, and may further comprise one or more protective coatings, e.g. plating layers or anodizing layers.

Figure 21:
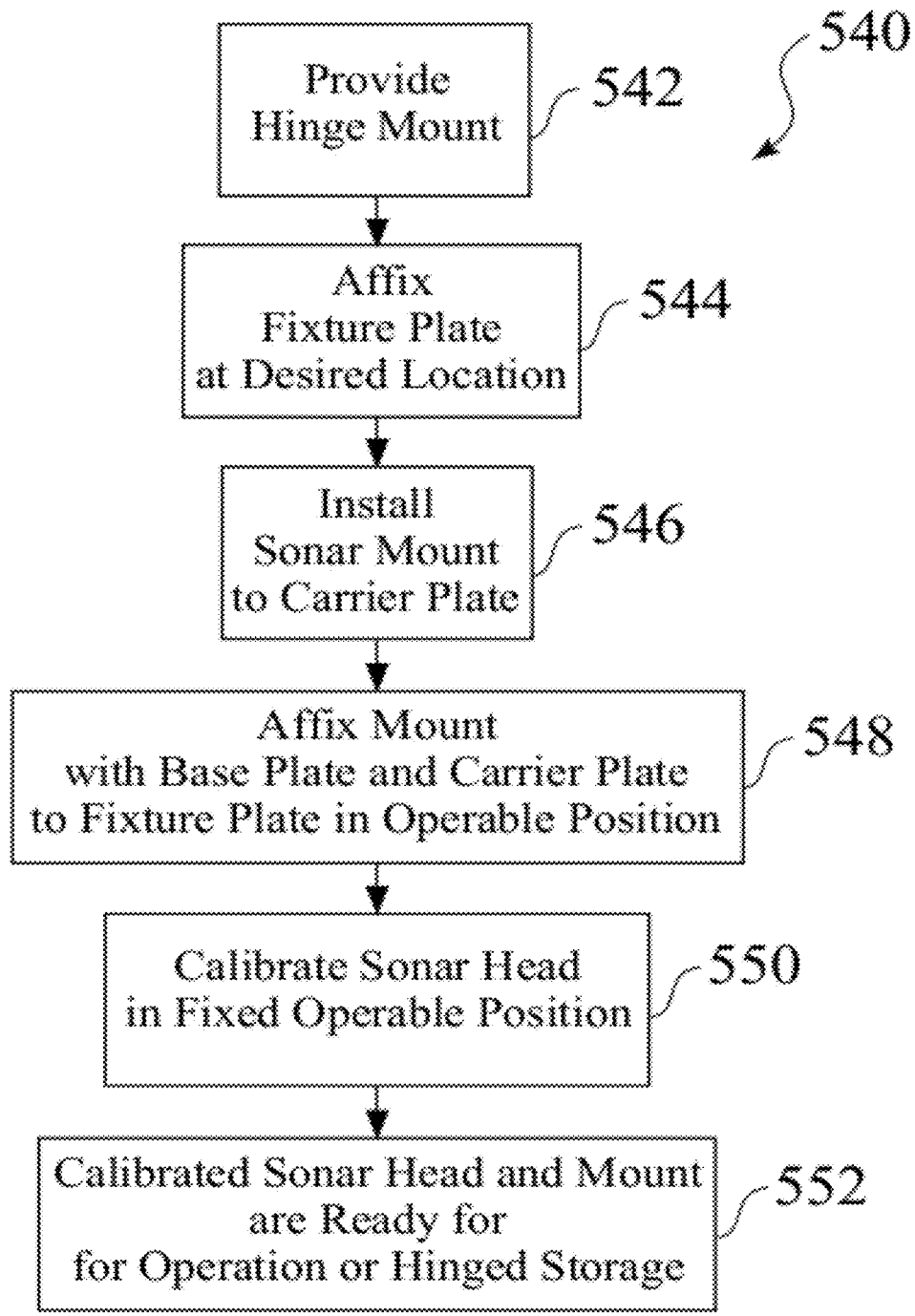
FIG. 21 is a flowchart of an exemplary process associated with the installation of an enhanced sonar mount, using a hinge mount assembly.

FIG. 21 is a flowchart of an exemplary process 540 associated with the installation of an enhanced sonar mount 10, wherein a hinge mount assembly 460 is provided 542. To begin installation, the fixture plate 462 is affixed 544 at a desired location, such as in relation to a vessel 14, e.g. a boat or ship 14. A sonar mount, such as but not limited to an enhanced sonar mount 10, is affixed to the carrier plate 464, such as by bolts 465 that extend through the carrier plate 464 into the base plate 468 of the sonar mount 10. The mount 10 and base plate 468 are then affixed 548 to the fixture plate 462 when the hinge mount assembly 460 is in the operable position 478o, such as by pins 475 and fasteners 471, as described above. The sonar head 12 and associated systems are then calibrated 550 when the sonar mount is located in the operable position 478o, e.g. such as by patch testing. After calibration, the sonar head 12, mount 10, and other associated systems are ready 552 for operation, and/or may be stowed 478s.

Figure 22:
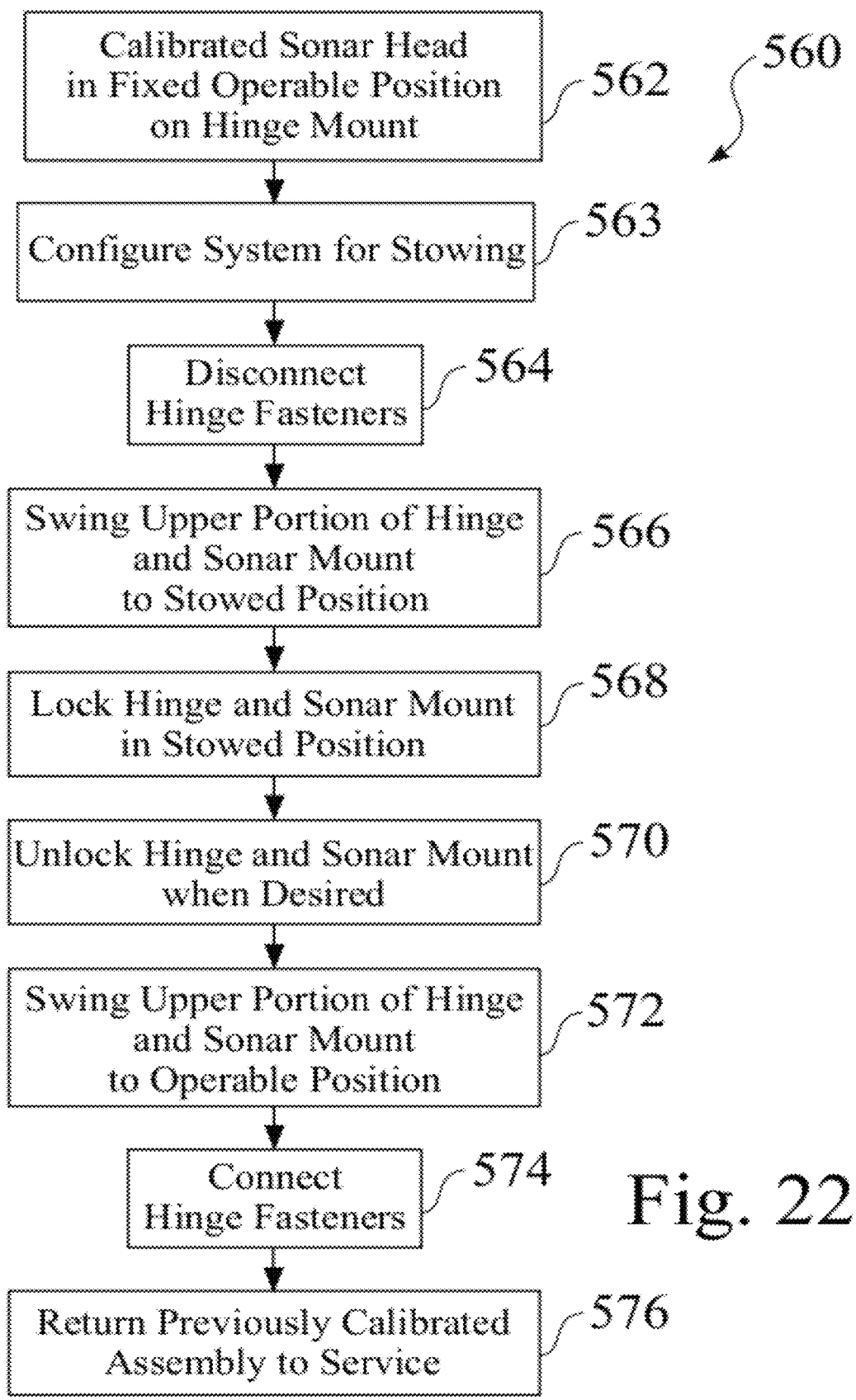
FIG. 22 is a flowchart of an exemplary process for any of stowing or returning to service of a sonar mount that is mounted to a hinge mount assembly.

FIG. 22 is a flowchart of an exemplary process 560 for any of stowing or returning to service of a sonar mount 10 that is mounted to a hinge mount assembly 460. At step 562, a sonar mount 10 and head unit 12, which is previously mounted and calibrated, is affixed to the hinge mount assembly 460 in an operable position 478O. As desired, the system 10 may be configured 563 for stowing, such as by rotating the cross tube 25 to bring the system to stowable position 15s, and/or by rotating the Z-tube 27 and or camera 420. To stow the mount in a stowed position 478s, the hinge fasteners 471 are first removed, such that the base plate 468 and the carrier plate 464 are free to be hingeably rotated 566 away from the fixture plate 462 toward the stowable position 478s. The hinge and sonar mount are then affixed or otherwise locked 568 in the stowed position 478s. For example, as seen in FIG. 20, a weldment or other suitable structure 522 may be affixed to the fixture plate 462 and to the base plate 468, such as by bolts 524,526.

As desired, the hinge 460 and sonar mount 10 may be unlocked 570 from the stowed position 478s, such as by removal of bolts 524, 526 and weldment 522, whereby the base plate 468 and the carrier plate 464 are free to be hingeably rotated 572 back into contact with the fixture plate 462 to the operable position 478O. The hinge fasteners 471 are then retightened 574, wherein the previously calibrated sonar head 12 and associated systems may be returned 576 to service.

Manual and Remote Tilt Mechanisms for Enhanced Solar Mount.

Figure 23:
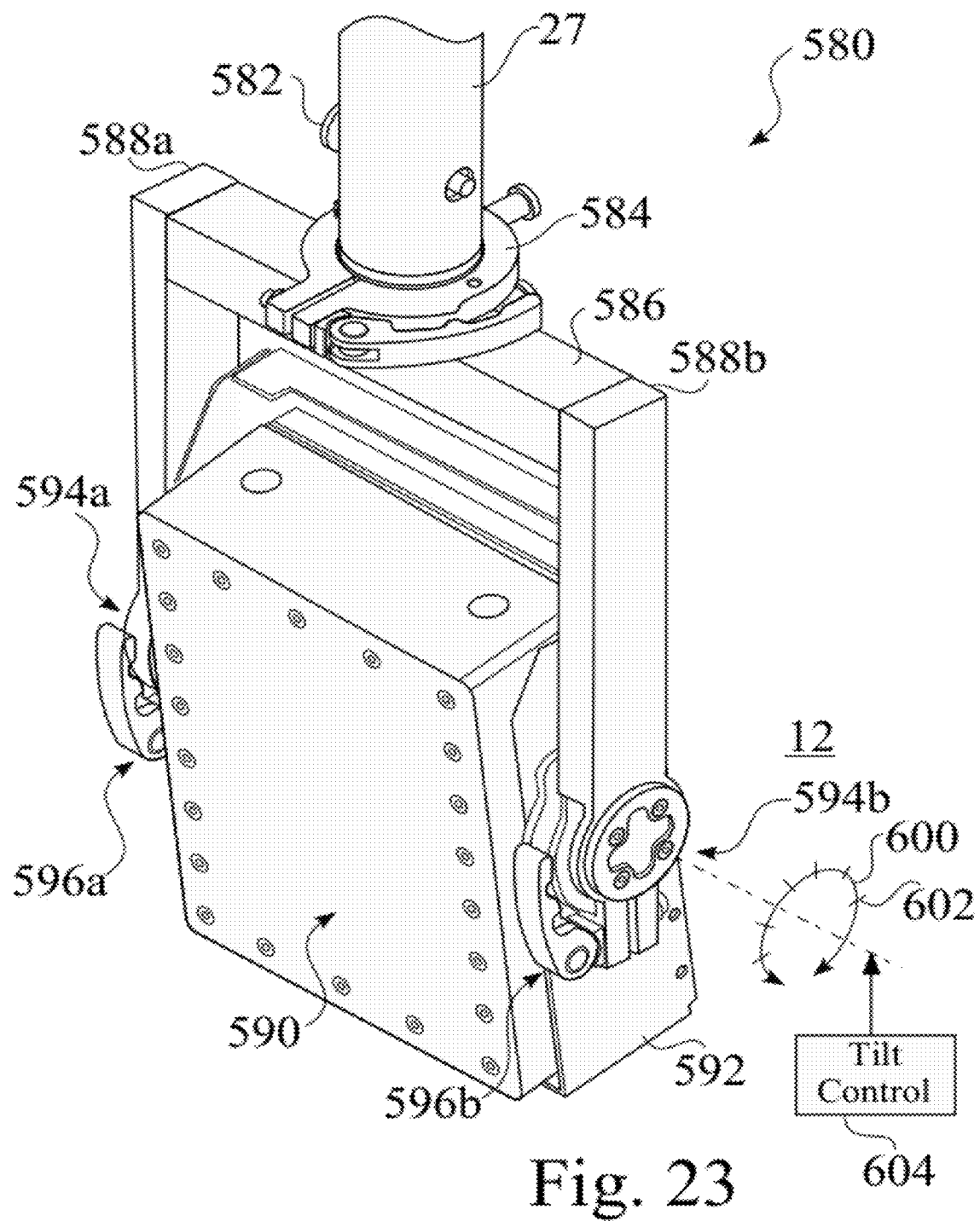
FIG. 23 is a partial perspective view of a tiltable sonar mount associated with a Z-Pole Assembly for an exemplary embodiment of an enhanced sonar mount.

FIG. 23 is a partial perspective view of a tiltable sonar mount 580 associated with a Z-Pole assembly 27 for an exemplary embodiment of an enhanced sonar mount 10.

As seen in FIG. 23, a sonar head structure 590, e.g. a sonar head 12, is mountably located at the lower end of the Z pole 27. The exemplary tiltable sonar mount 580 shown in FIG. 23 comprises a central member 586, having a mounting head 584, which is mountable to the Z-pole 27, such as by but not limited to a pin structure 582. One or more arms 588, e.g. 588a,588b, extend from the central member 586, and further comprise coaxial pivot mount assemblies 594a,594b, which may be rotatably tilted 600, e.g. either manually or remotely, by tilt control 604.

As also seen in FIG. 23, a central sonar head structure 590 is affixed 596a,596b to a head bracket 592, which is affixed to the pivot assemblies 594a,594b, such as by but not limited to quick release assemblies 596.

The sonar head 590 may be controllably tilted 600, such as through one or more calibrated angles, which may further be integrated into the system software, wherein operational data from the sonar unit 590 may be adjusted, based on the tilt angle 600. While the tilt angle 600 may be manually set and changed, such as through one or more preset angles, other system embodiments may provide automated tilt adjustment 604, such as through but not limited to any of motors, stepper motors, solenoids, linkage, or any combination thereof.

Manual and Remote Pan Mechanisms for Enhanced Solar Mount.

Figure 24:
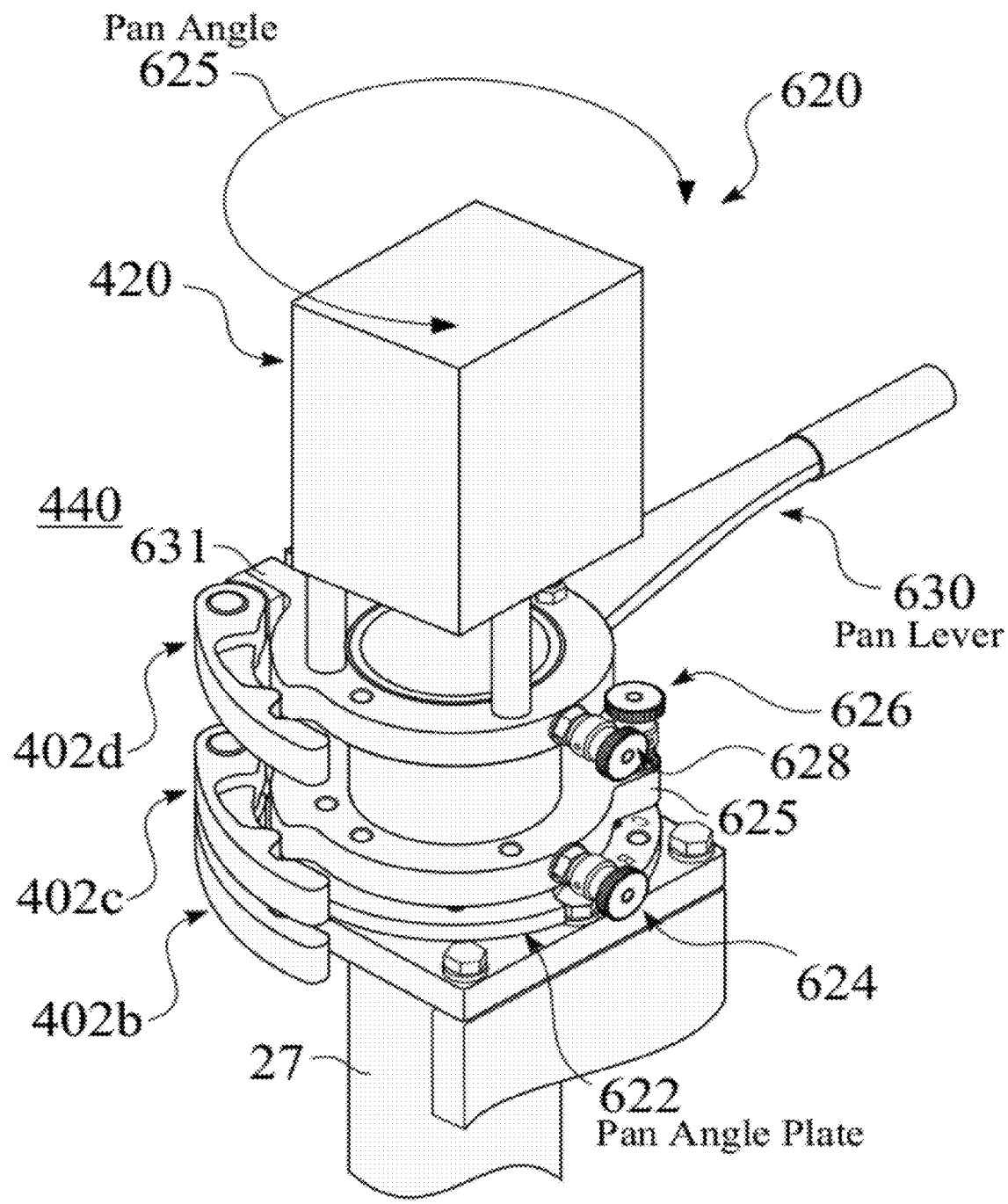
FIG. 24 is a partial perspective view of an exemplary embodiment of an adjustable pan structure for an enhanced sonar mount.
Figure 25:
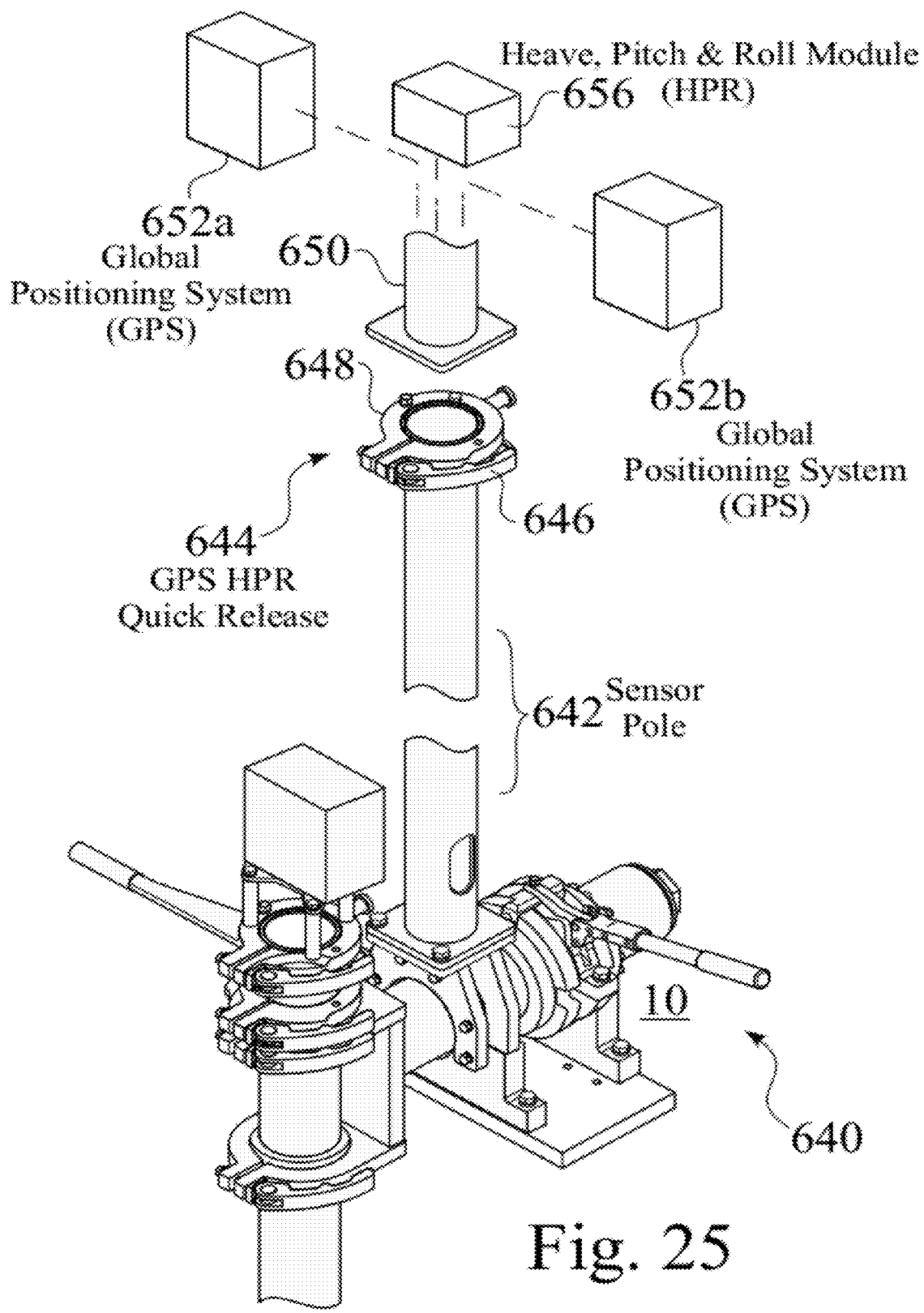
FIG. 25 is a partial perspective view of an exemplary embodiment of a GPS HPR Quick Release mechanism for an enhanced sonar mount.

FIG. 24 is a partial perspective view 620 of an exemplary embodiment of an adjustable pan structure 440 for an enhanced sonar mount 12, such as for yaw adjustment 40, and/or camera pan angle 625. The exemplary adjustable pan structure 440 seen in FIG. 24 comprises a pan angle plate 622, which may preferably be indexed, such as to allow the system controller 692 to compensate for pan angle 625, such as in combination with heave, pitch and roll (HPR) data provided from an HPR unit 656 (FIG. 25). The pin angle plate 622 has corresponding latches 624 and 626, which may be set or released, such as to provide rotation of the pan angle 625, by simultaneously rotating the Z tube 27 or, if desired or necessary, to release the pan angle plate 622 from the Z tube 27, such as for adjustment of the mounting height of the Z-tube 27.

The exemplary adjustable pan structure 440 seen in FIG. 24 comprises a pan lever 630, such as for manual rotation of the pan angle 625, wherein a user may rotate the pan angle 625 in a searchlight mode, either between index marks, or with no indexing.

The pan structure 440 may preferably comprise a mechanism for automated rotation of the pan angle 625, such as controlled through the system controller 692.

Quick Release for any of GPS, Heave Pitch & Roll (HPR) Sensor Pole.

FIG. 25 is a partial perspective view 640 of an exemplary embodiment of a GPS HPR quick release mechanism 644 for an enhanced sonar mount 10. As seen in FIG. 25, the enhanced sonar mount 10 may comprise a mechanism 642, e.g. a sensor pole 642, by which different hardware may be attached and used, such as in conjunction with a sonar head 12 and a system controller 692.

The sensor pole 642 seen in FIG. 25 is attached to and extends from the enhanced sonar mount 10. A secondary structure 650 may preferably be attached to the sensor pole 642, such as for attachment of any of one or more global positioning systems (GPS) 652 (e.g. two GPS units 652a, 652b for differential GPS operations), or a heave, pitch and roll (HPR) unit 656. Other units that may be attached may comprise but are not limited to a laser ring gyro unit, a camera, a laser scanner, an antenna, and/or telecommunications equipment.

Such sensors may preferably provide the exact position and/or heading of the boat or ship 14, and may be used, such as through the system controller 692, to steer the sonar beam from the sonar head 12, such as toward the bottom of the ocean. As discussed above, the mounting location of the Z tube 27, such as corroborated with associated indicia, may also preferably be coordinated with the system controller 692, such as to provide automated calibration of the system, e.g. system 840 (FIG. 30).

Quick Release Mechanisms for Sonar Attachments.

Figure 26:
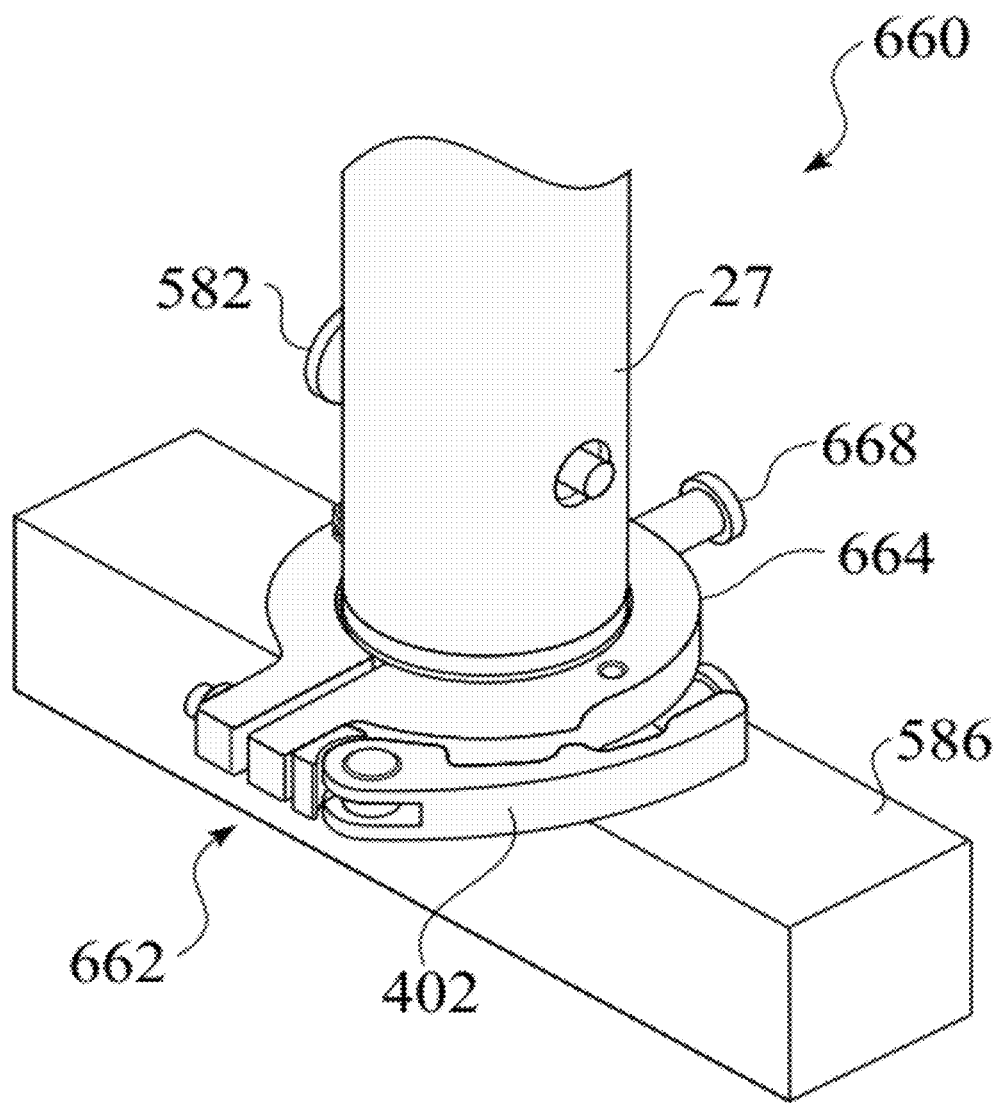
FIG. 26 is a partial perspective view of an exemplary embodiment of a quick release mechanism for an enhanced sonar head mount.

FIG. 26 is a detailed partial perspective view 660 of an exemplary embodiment of a quick release mechanism 662 for an enhanced sonar head mount 12, such as having a lever 402, which readily provides any of assembly, disassembly, and/or adjustment, without the need for tools, e.g. wrenches, ratchets, and/or sockets. This is particularly advantageous for the enhanced sonar mount 10, which is typically installed on boats or ships 14, where tools may readily be misplaced or lost.

Quick Release Mechanisms for Cameras and Laser Scanners.

Figure 27:
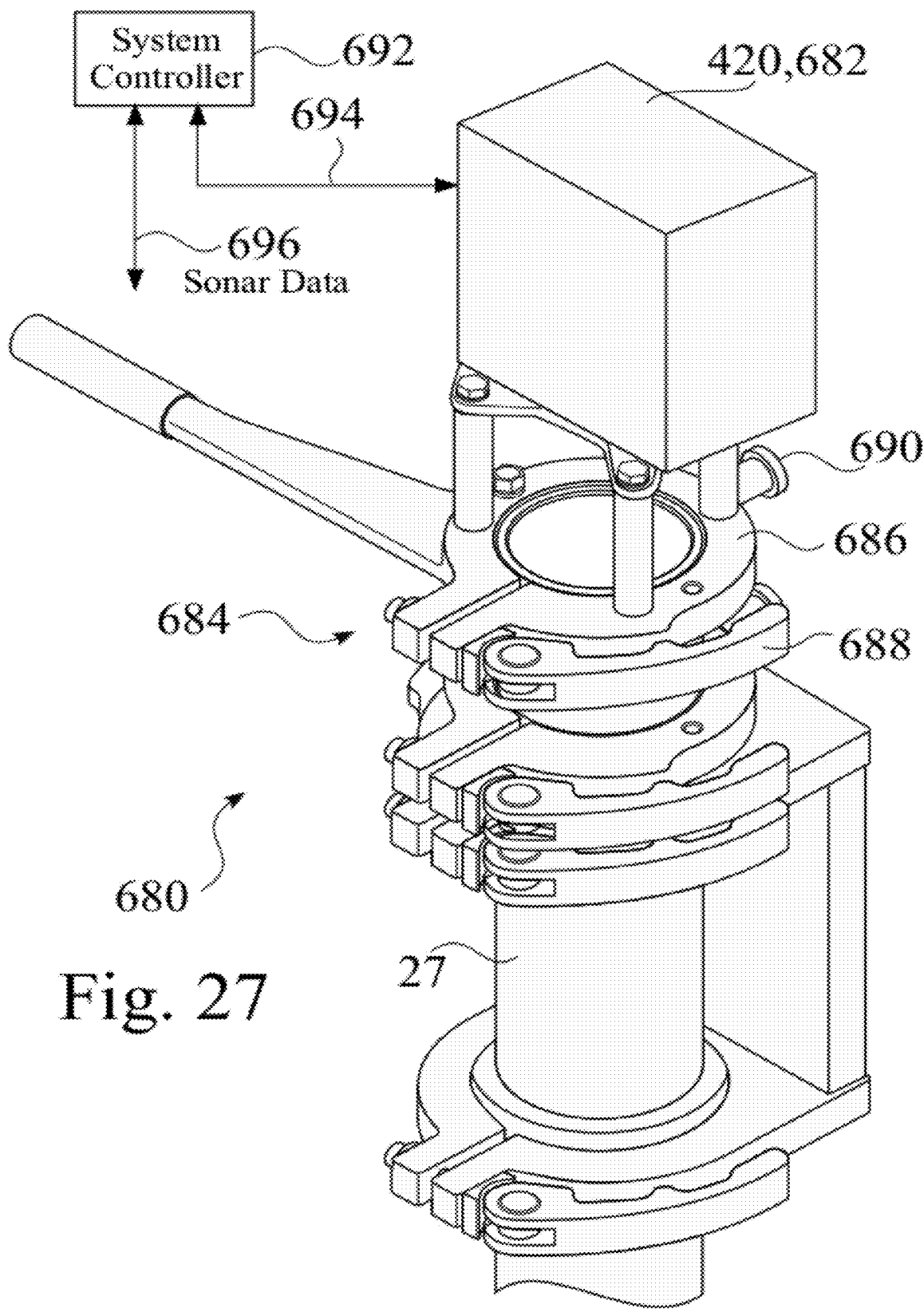
FIG. 27 is a partial perspective view of an exemplary embodiment of a quick release mechanism for a mount associated with any of a camera or a laser scanner.

FIG. 27 is a partial perspective view of an exemplary embodiment of a quick release mechanism 680 for a mount associated with any of a camera 420 or a laser scanner 682. The entire assembly 684 is releasable through the use of quick release lever 688 and pin 690, which may be color coded, e.g. green. The quick release lever 688 and pin 690 are preferably operable by a user without the need for tools. The camera and/or or laser scanner 682 may preferably be used in conjunction with the sonar head 12, such as to provide above water images that correspond to matching sonar data.

Vessel of Opportunity Mounting Kit and Associated Processes.

Figure 28:
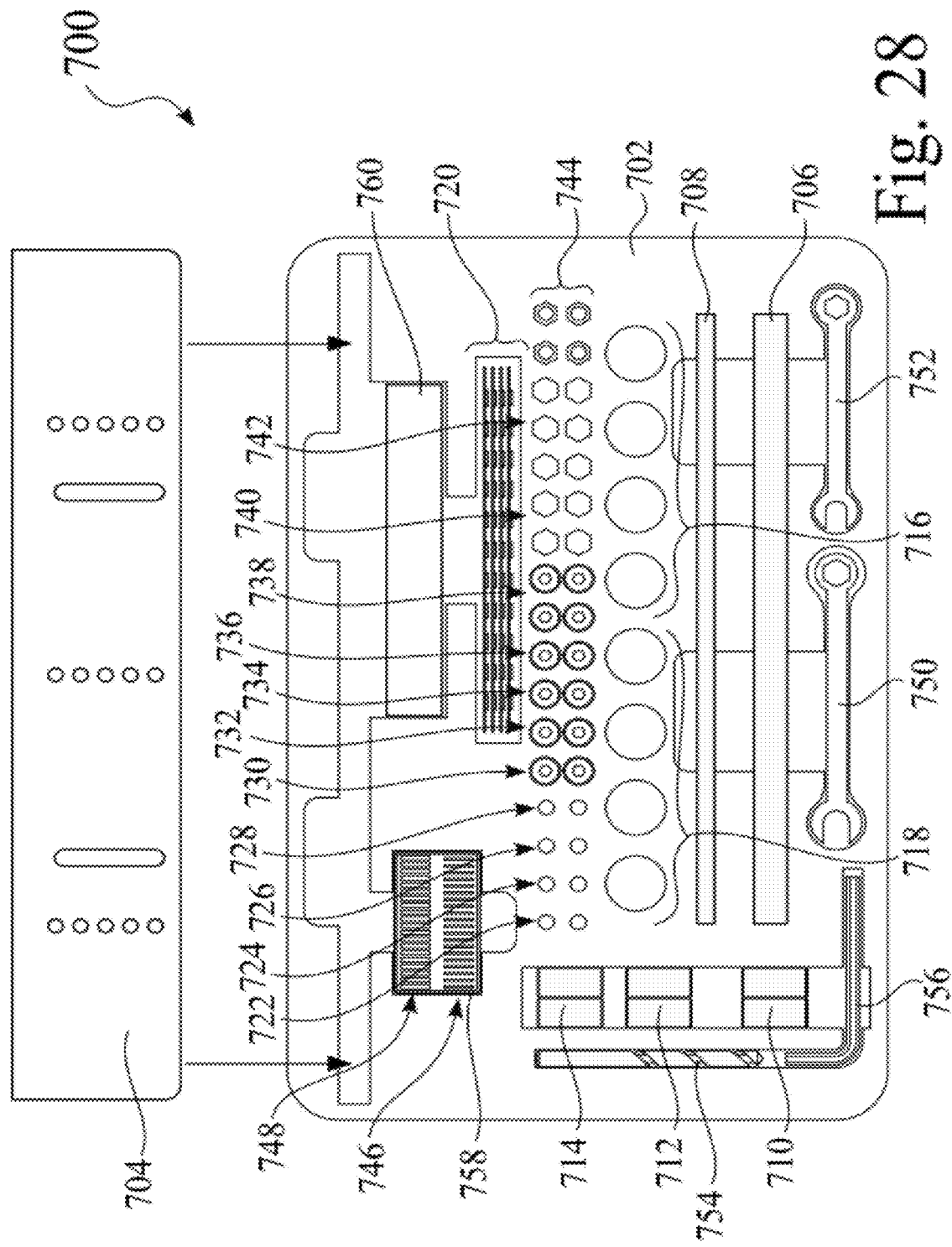
FIG. 28 is a schematic view of a VOOP mounting kit for an enhanced sonar mount.

FIG. 28 is a schematic view of a vessel of opportunity (VOOP) mounting kit 700 for an enhanced sonar mount 10. While the VOOP mounting kit 700 can be used for standard installations of sonar mounts 10, the VOOP mounting kit 700 is particularly advantageous for installations that require self sufficiency, such as related to any of remote locations, emergency response and investigation, crime scene investigation, or search and rescue operations.

For example, such applications may require rapid response to a remote location, wherein personnel may transport and provide a sonar mount 10, a sonar head 12, a controller 692 (FIG. 27), and other related hardware, but are required to install the sonar mount 10 on a local boat or ship 14.

The VOOP mounting kit 700 comprises a wide variety of commonly required plates, hardware, fasteners, tools, and other supplies that are particularly suited to off-site mounting of the enhanced sonar mount 10 and related hardware.

The exemplary VOOP mounting kit 700 seen in FIG. 28 comprises a foam insert 702, which may preferably be packaged within a travel case. The foam insert is preferably shaped to receive the contents of the VOOP mounting kit 700.

The exemplary VOOP mounting kit 700 seen in FIG. 28 further comprises a selection of plates, bars and other materials that are configured to mount an enhanced sonar mount 10 to a wide variety of different vessels, such as:

- a jacking angle 704 having a variety of prefabricated holes and slots;
- a 20 inch×8 inch fixed plate 706;
- an outboard plate 708;
- 10 inch clamp bars 710 (Qty. 2);
- 8 inch clamp bars 712 (Qty. 2);
- 6.25 inch clamp bars 714 (Qty. 2);
- ½-13 UNC×2.0 inch Stainless Steel Swivel Leveling Mounts 716 (Qty. 4);
- ½-13 UNC×4.0 inch Stainless Steel Swivel Leveling Mounts 718 (Qty. 4); and
- 12 inch×6 inch×⅛ inch Anti-Slip Rubber Sheet 720, with raised discs (Qty. 4).

The exemplary VOOP mounting kit 700 seen in FIG. 28 also comprises a selection of mounting hardware, such as but not limited to:

- ½×13, 8 inch OAL Studs, 1.5 inch 18-8 Thread, 722 (Qty. 2);
- ½×13, 6 inch OAL Studs, 1.5 inch 18-8 Thread, 724 (Qty. 2);
- ½×13, 5 inch OAL Studs, 1.5 inch 18-8 Thread, 726 (Qty. 2);
- ½×13, 4 inch OAL Studs, 1.5 inch 18-8 Thread, 728 (Qty. 2);
- ½-13 UNC×6.0 inch FHC 18-8 Screws 730 (Qty. 2);
- ½-13 UNC×5.0 inch FHC 18-8 Screws 732 (Qty. 2);
- ½-13 UNC×4.0 inch FHC 18-8 Screws 734 (Qty. 2);
- ½-13 UNC×3.0 inch FHC 18-8 Screws 736 (Qty. 2);
- ½-13 UNC×2.0 inch FHC 18-8 Screws 738 (Qty. 4);
- ½–13×1.750 inch 18-8 Stainless Steel Hex Bolts 740 (Qty. 4);
- ½–13×1.500 inch 18-8 Stainless Steel Hex Bolts 742 (Qty. 6);
- ½–13×1.25 inch long Stainless Steel Coupling Nuts 744 (Qty. 4);
- 0.515 ID×0.875 inch OD×0.060 inch 18-8 Washers 746 (Qty. 20); and
- 0.510 inch ID×0.87 inch OD×0.060 inch 18-8 Split Lock Washers 748 (Qty. 20).

As well, the exemplary VOOP mounting kit 700 seen in FIG. 28 comprises a selection of tools and containers, such as but not limited to:

- ¾ inch Combination Wrenches 750 (Qty. 2);
- ⅝ inch Combination Wrenches 752 (Qty. 2);
- 33/64 inch×6.625 inch OAL HSS Jobber Drill 754 (Qty. 1);
- 5/16 inch×5" Stainless Steel Hex Key 756 (Qty. 1);
- 4.75 inch×2.625 inch×1.125 inch, 4 Compartment Plastic Box 758 (Qty. 1); and
- 11 inch×6.75 inch×1.75 inch, 6 Compartment Plastic Box 760 (Qty. 1).

Figure 29:
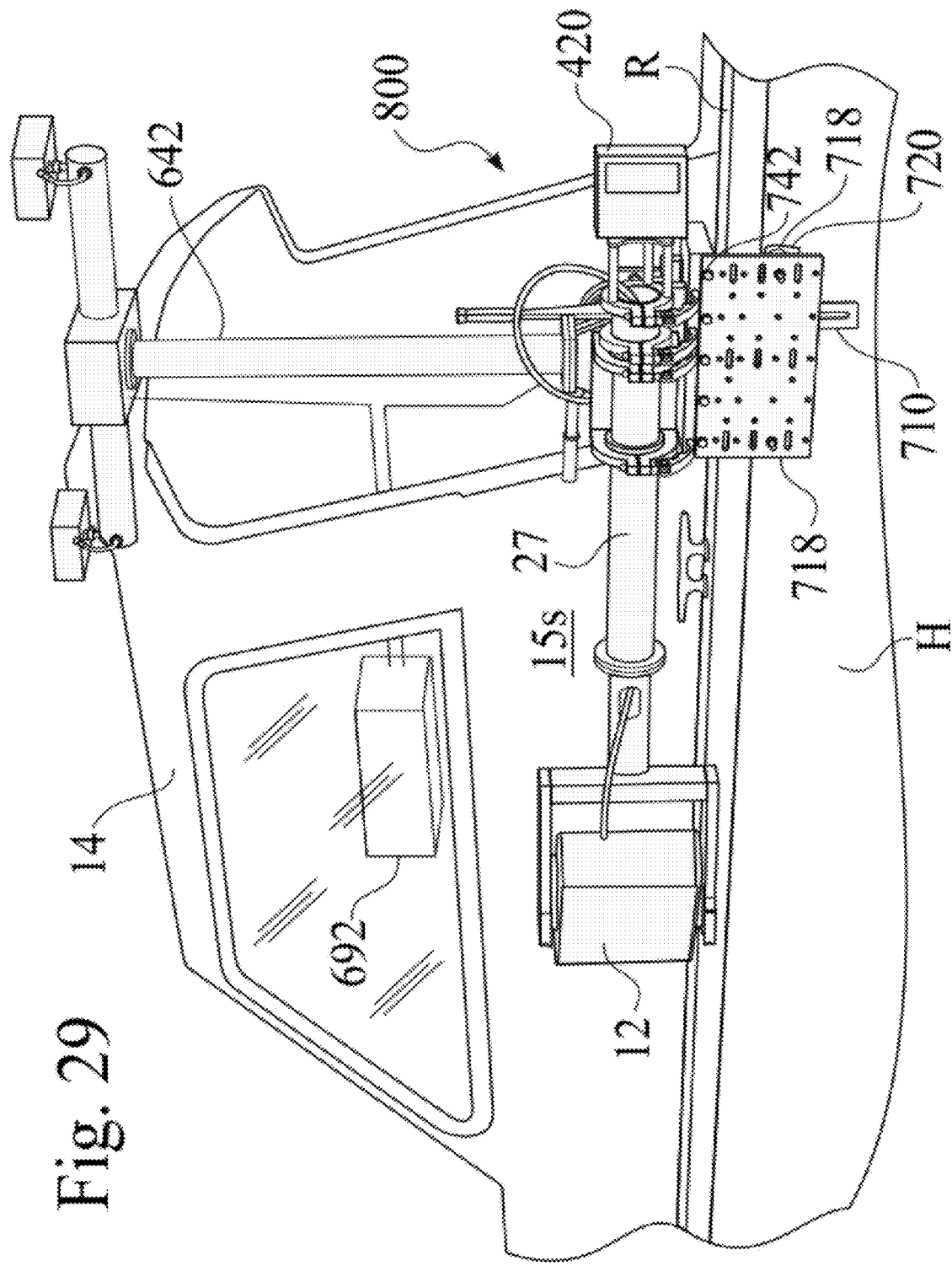
FIG. 29 is a schematic view of an enhanced sonar mount installed on a vessel with a VOOP mounting kit.

FIG. 29 is a schematic view 800 of an enhanced sonar mount 10 installed on a vessel 14 with a VOOP mounting kit 700. As seen in FIG. 29, a variety of mounting plates, hardware, and materials from the VOOP kit 800 have been configured to provide a rigid mounting structure 802 to the side of a boat 14, wherein an enhanced sonar mount 12 is affixed, such that an attached sonar head 12 may be calibrated through a system controller 692. The exemplary mounting structure 802 seen in FIG. 28 comprises a plate, e.g. fixed plate 706, that is affixed to the base plate 26 of the enhanced sonar mount 10 by bolts, e.g. bolts 742. Other hardware attached to the plate extends toward the hull H of the boat 14, herein rubber sheeting, e.g. rubber sheeting 720, is located between swivel mounts 718 and the hull H. The mounting structure 802 also comprises a selection of plates, bars and other materials in the inboard side of the rail R and/or hull H, to secure the enhanced sonar mount 12 to the boat 14.

System Integration.

FIG. 30 is a schematic block diagram showing system integration of an exemplary system 840 comprising an enhanced sonar mount 10. While a sonar head 12 may be operated independently, such as with dedicated sonar electronics 842, some system embodiments 840 provide further system integration for any of sensor operations, enhanced mount control, storage for calibration or other data, power systems, and/or telecommunications.

For example, as seen in the exemplary system 840, a system controller 692, comprising one or more processors, is configured to receive data from any of the sonar head 12, sonar electronics 842, a camera 420, a laser scanner 682, a heave, pitch, and roll (HPR) unit 656, one or more GPS modules 652, e.g. 652a,652b, or other sensors 843, or other electronics associated with one or more of the sensors. Data storage 844, such as linked through the system controller 692, may preferably be used for storage, monitoring, and/or display of system data.

The exemplary system 840 seen in FIG. 30 also comprises controllable parameters associated with the enhanced sonar mount, such as for any of tilt control 604, camera pan 625, yaw control 625, gear drive control 233, and/or other control 850.

A power module 846 having one or more busses 848, e.g. 848*a*,848*b*, may provide necessary power to one or more of the sensors or mount control mechanisms.

In some embodiments, the a communications unit 852, e.g. a transceiver 852, may be linked to the system 840, such as to receive or send signals 856 through an antenna 854, or through other wired or wireless networks. For example, system calibration data or operation data may be transmitted from the system 840, and/or control signals or instructions may be received by the system 840.

The enhanced sonar mount 10 inherently provides accurate, precise, and repeatable alignment of a sonar head 12 in relation to a vessel, whether in or out of water, wherein the sonar head may be readily aligned to a vessel and vessel electronics, e.g. GPS, IMU, gyro. The tilt mechanism allows the sonar head to be lifted to a stowable position, e.g. for any of vessel maneuvering, mooring, or trailering, and further allows the sonar head 12 to be accurately returned to an operable position, thus providing repeatable pole positioning, without having to re-calibrate. Furthermore, the patch test/calibration surface does not have to be co-located with any of the survey area or area of interest for sonar mapping.

The repeatability, i.e. precision, applies to the Z pole in water position and out of water position, the adjustment of the Z pole depth, pitch, yaw, and the X pole ship placement.

The clamp mechanism is operable to establish and maintain any of Z direction or pitch. The enhanced mount provides repeatable positioning of both the cross tube and the Z tube, and may preferably provide any of ship to ship interchangeability, lateral and vertical adjustability, break away clamping of the cross tube, e.g. through the use of a shear block, quick release mechanisms, hingeable stowage, or manual or remote pan or tilt. An optional modular mounting kit aids in situ installations.

As well, the fixture plate and base plate design, such as with set pins, makes it very easy and accurate to move the enhanced sonar mount 14 from one vessel 14 to another, without having to re-calibrate or remeasure offsets.

Although the invention is described herein with reference to the preferred embodiment, one skilled in the art will readily appreciate that other applications may be substituted for those set forth herein without departing from the spirit and scope of the present invention. For example, the mount disclosed herein may be used for equipment other than sonar, for example photographic equipment, instrumentation, etc. Further, the mount disclosed herein may be used with other transport devices, such as trucks, automobiles, railroads, and airplanes. Finally, the particular fastening mechanism shown in the figures and discussed in the text are illustrative only and are not intended to limit the manner in which the various elements of the invention may be joined. Accordingly, the invention should only be limited by the Claims included below.

The invention claimed is:

1. A mount for a sonar head, comprising:
a base having an attachment mechanism for securing the mount to a surface;
a clamp mechanism that is securable to the base;
a cross tube, coupled to the clamp mechanism, wherein the clamp mechanism is operable to release the cross tube to establish any of a selected Z direction or a pitch adjustment, wherein the clamp mechanism is operable to secure the cross tube to maintain any of the established Z direction or pitch adjustment during operation of the mount;
a Z tube, coupled to an axis of the cross tube at an end of the cross tube;
an equipment mount positioned at at least one end of the Z tube for connection to the sonar head;
a Z tube coupling mechanism for coupling of the Z tube to the cross tube, wherein the Z tube coupling mechanism is operable to release the Z tube to establish any of a selected Z direction or a yaw adjustment, and wherein the Z tube coupling mechanism is operable to secure the Z tube to maintain any of the established Z direction or yaw adjustment during operation of the mount; and
a tilt mechanism associated with the clamp mechanism that is operable to release the cross tube for rotation about the cross tube axis to effect tilting of equipment mounted to the equipment mount, wherein the tilt mechanism further comprises a lock mechanism that is operable to secure the cross tube at a selected position;
wherein the clamp mechanism maintains any of the established cross tube Z direction or pitch adjustment relative to the tilt mechanism during operation thereof.

2. The mount of claim 1, further comprising:
a gear lift drive, the gear lift drive comprising
a first gear mounted to the cross tube, and
a drive unit comprising a second gear that is engageable with the first gear;
wherein when the second gear is engaged with the first gear, rotation of the second gear rotates the second gear and the cross tube.

3. The mount of claim 2, wherein the rotation of the second gear is provided by any of manual rotation by a user or automated rotation by an electric actuator.

4. The mount of claim 1, wherein the Z tube comprises a plurality of mountable positions; and
wherein each of the mountable position may be integrated with a system controller.

5. The mount of claim 4, wherein the Z tube further comprises at least one marking indicia associated with each of the mountable positions.

6. The mount of claim 1, wherein the cross tube comprises a plurality of mountable positions; and
wherein each of the mountable positions may be integrated with a system controller.

7. The mount of claim 4, wherein the cross tube further comprises at least one marking indicia associated with each of the mountable positions.

8. The mount of claim 1, wherein the Z tube coupling mechanism comprises at least one quick release mechanism for coupling of the Z tube to the cross tube, wherein the quick release mechanism is operable by a user without tools for any of releasing or securing the Z tube.

9. The mount of claim 1, further comprising:
a hinge mount assembly comprising
a carrier plate that is affixed to the base, and
a fixture plate that is hingeably attached to the carrier plate, and is fixedly attachable to a mounting location;
wherein the carrier plate is rotatable between a first position and a second position;
wherein any of the carrier plate or the base is securable to the fixture plate when the carrier plate is in the first position; and wherein the position of any of the carrier plate or the base is securable in when the carrier plate is in the second position.

10. The mount of claim 1, wherein the equipment mount comprises at least one rotatable pivot assembly, wherein the sonar head may be tiltably moved between any of a plurality of positions.

11. The mount of claim 10, wherein the tiltable movement of the sonar head is provided by any of manual rotation of the pivot assembly by a user or automated rotation of the pivot assembly by an actuator.

12. The mount of claim 1, wherein the Z tube coupling mechanism comprises an adjustable pan structure for any of manual or automated yaw adjustment.

13. The mount of claim 12, wherein the adjustable pan structure comprises a plurality of indexed locations.

14. The mount of claim 12, wherein the yaw angle is linked to a system controller.

15. The mount of claim 1, further comprising:
a mechanism for mounting any of a global positioning system (GPS) unit, a Heave Pitch & Roll (HPR) unit, a camera, or a laser scanner.

16. The mount of claim 15, wherein the mounting mechanism comprises at least one quick release mechanism, wherein the quick release mechanism is operable by a user without tools.

17. The mount of claim 1, further comprising:
a mounting kit associated therewith for affixing the mount to a vessel;
wherein the mounting kit comprises any of material, brackets, hardware, fasteners, tools, or supplies.

18. The mount of claim 1, wherein the clamp mechanism further comprises:
a first clamp plate having an aperture formed therethrough for receiving the cross tube;
a second clamp plate having an aperture formed therethrough for receiving the cross tube;
a collet positioned substantially between the first clamp plate and the second clamp plate and having an aperture formed therethrough for receiving the cross tube; and
a fastening mechanism for selectably forcing the first clamp plate and the second clamp plate together to cause the collet to clamp the cross tube securely against movement of the cross tube relative to the clamp mechanism, and for selectably releasing the first clamp plate from the second clamp plate to cause the collet to release the cross tube and permit movement of the cross tube relative to the clamp mechanism.

19. The mount of claim 1, wherein the tilt mechanism further comprises:
a ring associated with the clamp mechanism, the ring comprising a plurality of notches formed therein about a circumference thereof;
wherein the clamp mechanism is secured to the cross tube in an established, fixed relation thereto;
a bushing having an aperture formed therethrough for receiving the cross tube, the aperture having a sufficient diameter to permit free rotation of the cross tube therein; and
a release mechanism comprising a lever actuated pawl that is selectably operable to engage the pawl with a selected one of the notches in the ring to prevent rotation of the cross tube within the bushing, and that is operable to disengage the pawl from the notches to permit free rotation of the cross tube within the bushing to effect tilting of equipment associated with the Z tube.

20. The mount of claim 1, further comprising:
an enlarged bolt head associated with an end of the cross tube opposite to an end associated with the Z tube;
wherein the bolt head has a profile that engages with a lift tool; and
wherein the lift tool is operable to rotate the cross tube when the cross tube is released by the tilt mechanism.

21. The mount of claim 1, wherein the base further comprises:
a fixed plate that is configured for attachment to the vehicle surface; and
a mount plate associated with the clamp mechanism and the tilt mechanism;
a fastening mechanism that selectably secures the mount plate to the fixed plate and that allows separation of the mount plate from the fixed plate; and
a key mechanism for maintaining alignment between the fixed plate and the mount plate when the mount plate is affixed to the fixed plate after removal therefrom.

22. A system for mounting a sonar head, comprising:
a base having an attachment mechanism for securing the mount to a surface;
a clamp mechanism that is securable to the base;
a cross tube, coupled to the clamp mechanism, wherein the clamp mechanism is operable to release the cross tube to establish any of a selected Z direction or a pitch adjustment, and wherein the clamp mechanism is operable to secure the cross tube to maintain any of the established Z direction or pitch adjustment during operation of the mount;
a Z tube, coupled to the cross tube;
an equipment mount positioned at at least one end of the Z tube for connection to the sonar head;
a Z tube coupling mechanism for coupling of the Z tube to the cross tube, wherein the Z tube coupling mechanism is operable to release the Z tube to establish any of a selected Z direction or a yaw adjustment, and wherein the Z tube coupling mechanism is operable to secure the Z tube to maintain any of the established Z direction or yaw adjustment during operation of the mount; and
a tilt mechanism associated with the clamp mechanism that is operable to release the cross tube for rotation about the cross tube axis to effect tilting of equipment mounted to the equipment mount, wherein the tilt mechanism further comprises a lock mechanism that is operable to secure the cross tube at a selected position;
wherein the clamp mechanism maintains any of the established cross tube Z direction or pitch adjustment relative to the tilt mechanism during operation thereof.

23. The system of claim 22, wherein the cross tube is adjustable for lateral positioning of the sonar head.

24. The system of claim 22, wherein the Z tube is adjustable for vertical positioning of the sonar head.

25. The system of claim 22, further comprising a mechanism for controlling the yaw of the Z tube, wherein the mechanism comprises any of a manual mechanism, an automated mechanism, or a remote mechanism.

26. The system of claim 22, further comprising a mechanism for controlling the tilt of the sonar head with respect to the equipment mount, wherein the mechanism comprises any of a manual mechanism, an automated mechanism, or a remote mechanism.

* * * * *